(12) United States Patent
Kim et al.

(10) Patent No.: US 11,503,483 B2
(45) Date of Patent: Nov. 15, 2022

(54) METHOD AND APPARATUS FOR SUPPORTING REDUNDANT PDU SESSIONS

(71) Applicant: LG ELECTRONICS INC., Seoul (KR)

(72) Inventors: Seokjung Kim, Seoul (KR); Laeyoung Kim, Seoul (KR); Jian Xu, Seoul (KR); Daewook Byun, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 16/981,420

(22) PCT Filed: Jun. 18, 2020

(86) PCT No.: PCT/KR2020/007885
§ 371 (c)(1),
(2) Date: Sep. 16, 2020

(87) PCT Pub. No.: WO2020/256425
PCT Pub. Date: Dec. 24, 2020

(65) Prior Publication Data
US 2021/0250788 A1    Aug. 12, 2021

(30) Foreign Application Priority Data

Jun. 18, 2019    (KR) .................. 10-2019-0072488
Sep. 10, 2019    (KR) .................. 10-2019-0112343
(Continued)

(51) Int. Cl.
*H04W 4/00*      (2018.01)
*H04W 24/04*     (2009.01)
(Continued)

(52) U.S. Cl.
CPC .......... *H04W 24/04* (2013.01); *H04W 60/04* (2013.01); *H04W 76/11* (2018.02); *H04W 76/15* (2018.02)

(58) Field of Classification Search
CPC . H04W 72/0406; H04W 24/04; H04W 76/15; H04W 60/04; H04W 76/11
See application file for complete search history.

(56) References Cited

U.S. PATENT DOCUMENTS

2019/0174449 A1    6/2019  Shan et al.
2020/0107213 A1*   4/2020  Park ................... H04L 43/08
2022/0104296 A1*   3/2022  Mary ................... H04W 76/15

FOREIGN PATENT DOCUMENTS

KR    1020180134685 A    12/2018
KR    1020190060667 A     6/2019
WO       2018064479 A1    4/2018

OTHER PUBLICATIONS

"3rd Generation Partnership Project; Technical Specification Group Services and System Aspects; Procedures for the 5G System; Stage 2 (Release 16)", 3GPP TS 23.502 V16.1.1 (Jun. 11, 2019).

* cited by examiner

*Primary Examiner* — Omoniyi Obayanju
(74) *Attorney, Agent, or Firm* — Dentons US LLP

(57) ABSTRACT

One disclosure of the present specification provides a method for supporting redundant protocol data unit (PDU) sessions. The method may be performed by a unified data management (UDM) node and comprise: receiving, from a first session management function (SMF) node, a first message including a first redundancy sequence number (RSN) which is allocated by the first SMF node for managing a first PDU session and an identifier of the first PDU session; transmitting, to a second SMF node for managing a second PDU session, a second message including the first RSN and
(Continued)

a PDU session pair ID, which is identical to the identifier of the first PDU session; and receiving, from the second SMF node, a third message including a second RSN which is allocated by the second SMF node and an identifier of the second PDU session. The second PDU session may be duplication of the first PDU session.

14 Claims, 26 Drawing Sheets

(30) Foreign Application Priority Data

| Oct. 4, 2019 | (KR) | ......................... 10-2019-0123065 |
| Dec. 16, 2019 | (KR) | ......................... 10-2019-0168070 |

(51) Int. Cl.
*H04W 76/15* (2018.01)
*H04W 76/11* (2018.01)
*H04W 60/04* (2009.01)

METHOD AND APPARATUS FOR SUPPORTING REDUNDANT PDU SESSIONS

This application is the National Stage filing under 35 U.S.C. 371 of International Application No. PCT/KR2020/007885, filed on Jun. 18, 2020, which claims the benefit of Korean Patent Application Nos. 10-2019-0072488 filed on Jun. 18, 2019, 10-2019-0112343 filed on Sep. 10, 2019, 10-2019-0123065 filed on Oct. 4, 2019 and 10-2019-0168070 filed on Dec. 16, 2019, the contents of which are all hereby incorporated by reference herein in their entirety.

BACKGROUND OF THE DISCLOSURE

Field of the Disclosure

The present disclosure relates to mobile communication

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The 5G mobile communication supports a plurality of numerologies or subcarrier spacing (SCS) for supporting various services. For example, when the SCS is 15 kHz, a wide area over conventional cellular bands is supported; in the case of 30 kHz/60 kHz, a dense urban area, lower latency, and wider carrier bandwidth is supported; and when the SCS is larger than 60 kHz or higher, bandwidth larger than 24.25 GHz is supported to overcome phase noise.

The NR frequency band is defined by two types (FR1, FR2) of frequency ranges. The FR1 ranges from 410 MHz to 7125 MHz, and the FR2 ranges from 24250 MHz to 52600 MHz, which may correspond to the millimeter wave (mmW) range.

For the convenience of descriptions, in the frequency range used for the NR system, the FR1 may indicate the "sub-6 GHz range" while the FR2 may indicate the "above 6 GHz range" and may be referred to as the millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the numerical values of the frequency ranges in the NR system may be changed. For example, the FR1 may include a frequency band ranging from 410 MHz to 7125 MHz as shown in Table 2. In other words, the FR1 may include a frequency band higher than 6 GHz (or 5850, 5900, or 5925 MHz). For example, a frequency band higher than 6 GHz (or 5850, 5900, or 5925 MHz) included in the FR1 may include the unlicensed band. The unlicensed band may be utilized for various applications, which may include communication for vehicles (for example, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

The ITU proposes three usage scenarios, e.g., eMBB (enhanced Mobile BroadBand), mMTC (massive Machine Type Communication), and URLLC (Ultra Reliable and Low Latency Communications). First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

FIG. 1 illustrates a structure of the next-generation mobile communication network.

The 5G Core (5GC) may include various constituting elements, and FIG. 1 shows Access and Mobility Management Function (AMF) 41, Session Management Function (SMF) 42, Policy Control Function (PCF) 43, User Plane Function (UPF) 44, Application Function (AF) 45, Unified Data Management (UDM) 46, and Non-3GPP InterWorking Function (N3IWF) 49, which correspond to part of the constituting elements.

The UE 10 is connected to the data network via the UPF 44 through the Next Generation Radio Access Network (NG-RAN).

The UE 10 may receive a data service even through untrusted non-3rd Generation Partnership Project (3GPP) access, for example, Wireless Local Area Network (WLAN). To connect the non-3GPP access to the core network, the N3IWF 49 may be deployed.

FIG. 2 shows an example of an expected structure of next-generation mobile communication from a node perspective.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

In FIG. 2, the UE can simultaneously access two data networks by using multiple protocol data unit or packet data unit (PDU) sessions.

FIG. 3 shows an example of an architecture for supporting simultaneous access to two data networks.

In the architecture shown in FIG. 3, a UE uses one PDU session to simultaneously access the two data networks.

Reference points shown in FIGS. 2 and 3 are as follows.

N1 represents a reference point between the UE and the AMF.

N2 represents a reference point between the (R)AN and the AMF.

N3 represents a reference point between the (R)AN and the AMF.

N4 represents a reference point between the SMF and the UPF.

N5 represents a reference point between the PCF and the AF.

N6 represents a reference point between the UPF and the DN.

N7 represents a reference point between the SMF and the PCF.

N8 represents a reference point between the UDM and the AMF.

N9 represents a reference point between the UPFs.

N10 represents a reference point between the UDM and the SMF.

N11 represents a reference point between the AMF and the SMF.

N12 represents a reference point between the AMF and the AUSF.

N13 represents a reference point between the UDM and the AUSF.

N14 represents a reference point between the AMFs.

N15 represents a reference point between the PCF and the AMF.

N16 represents a reference point between the SMFs.

N22 represents a reference point between the AMF and the NSSF.

FIG. 4 illustrates another example of a structure of a radio interface protocol between a UE and a gNB.

The radio interface protocol is based on the 3GPP radio access network specification. The radio interface protocol horizontally includes a physical layer, a data link layer, and a network layer; and is divided vertically into a user plane for data information transfer and a control plane for signaling transfer.

The protocol layers may be divided into a first layer (L1), a second layer (L2), and a third layer (L3) based upon the lower three layers of the Open System Interconnection (OSI) reference model widely used for communication systems.

In what follows, each layer of the radio interface protocol will be described.

The physical layer, namely the first layer, provides an information transfer service by using a physical channel. The physical layer is connected to a Medium Access Control (MAC) layer, namely, an upper layer of the physical layer, via a transport channel. Data is transferred between the MAC layer and the physical layer through the transport channel. In addition, data is transferred between different physical layers, namely, between physical layers of a transmitting side and a receiving side, through the physical channel.

The second layer includes the MAC layer, a Radio Link Control (RLC) layer, and a Packet Data Convergence Protocol (PDCP) layer.

The third layer include a Radio Resource Control (hereinafter, simply referred to as RRC). The RRC layer is defined only in the control plane and serves to control the logical channel, the transport channel, and the physical channel in association with configuration, reconfiguration, and release of radio bearers (hereinafter, RBs for short). In this case, the RB represents a service provided by the second layer for data transfer between the UE and the E-UTRAN.

The Non-Access Stratum (NAS) layer performs a function such as connection management (session management) and mobility management.

The NAS layer is divided into a NAS entity for Mobility Management (MM) and a NAS entity for Session Management (SM).

1) The NAS entity for MM provides the following typical function.

The following are included as a NAS procedure related to the AME

Registration management and access management procedure: the AMF supports the following function.

Reliable NAS signal connectivity (integrity protection, encryption) between the UE and the AMF 2) The NAS entity for SM performs session management between the UE and the SMF.

An SM signaling message is processed, namely, generated and processed, in a NAS-SM layer of the UE and the SMF. Content of the SM signaling message is not interpreted by the AMF.

In the case of SM signaling transmission,

The NAS entity for MM generates a NAS-MM message to induce a location and method for transferring an SM signaling message through a security header indicating NAS transmission of SM signaling and additional information for NAS-MM to be received.

In the case of receiving SM signaling, the NAS entity for SM performs integrity checking of the NAS-MM message and interprets additional information to induce a place and a method for deriving an SM signaling message.

Meanwhile, in FIG. 4, an RRC layer, and RLC layer, a MAC layer, and a PHY layer located below the NAS layer are collectively called an access stratum (AS) layer.

A network system (namely 5GC) for the next generation mobile communication (namely 5G) also supports non-3GPP access. A typical example of the non-3GPP access is WLAN access. The WLAN access may include both trusted and untrusted WLANs.

In the 5G system, the AMF performs not only 3GPP access but also Registration Management (RM) and Connection Management (CM) for non-3GPP access.

In order to support highly reliable URLLC services, a UE may set up two redundant PDU Sessions over the 5G network, such that the 5G network sets up the user plane paths of the two redundant PDU Sessions to be disjoint.

However, in case two redundant PDU sessions are handled via different SMFs, each SMF is difficult to know the PDU session ID which is handled by the other SMF.

SUMMARY OF THE DISCLOSURE

Therefore, the present disclosure is intended to provide a method that may solve the aforementioned problem.

Accordingly, in an effort to solve the aforementioned problem, a disclosure of the present disclosure provides a method for supporting redundant protocol data unit (PDU) sessions. The method may be performed by a unified data management (UDM) node and comprise: receiving, from a first session management function (SMF) node, a first message including a first redundancy sequence number (RSN) which is allocated by the first SMF node for managing a first PDU session and an identifier of the first PDU session; transmitting, to a second SMF node for managing a second PDU session, a second message including the first RSN and a PDU session pair ID, which is identical to the identifier of the first PDU session; and receiving, from the second SMF node, a third message including a second RSN which is allocated by the second SMF node and an identifier of the second PDU session. The second PDU session may be duplication of the first PDU session.

To solve the aforementioned problem, one aspect of the present disclosure also provides an unified data management (UDM), the UDM node comprising: at least one processor; and at least one memory capable of storing instructions and being connected electrically to the at least one processor operably. An operation, performed when the instructions are executed by the at least one processor, includes: receiving, from a first session management function (SMF) node, a first message including a first redundancy sequence number (RSN) which is allocated by the first SMF node for managing a first protocol data unit (PDU) session and an identifier of the first PDU session; transmitting, to a second SMF node for managing a second PDU session, a second message including the first RSN and a PDU session pair ID, which is identical to the identifier of the first PDU session; and receiving, from the second SMF node, a third message including a second RSN which is allocated by the second SMF node and an identifier of the second PDU session. The second PDU session is duplication of the first PDU session.

To solve the aforementioned problem, one aspect of the present disclosure also provides a non-volatile computer-readable storage medium recording instructions. The instructions, when executed by one or more processors, instruct the one or more processors to perform: receiving, from a first session management function (SMF) node, a first message including a first redundancy sequence number (RSN) which is allocated by the first SMF node for managing a first protocol data unit (PDU) session and an identifier of the first PDU session; transmitting, to a second SMF node for managing a second PDU session, a second message including the first RSN and a PDU session pair ID, which is identical to the identifier of the first PDU session; and receiving, from the second SMF node, a third message including a second RSN which is allocated by the second SMF node and an identifier of the second PDU session. The second PDU session is duplication of the first PDU session.

According to the disclosure of the present disclosure, the problem of the conventional technology described above may be solved.

DESCRIPTION OF EXEMPLARY EMBODIMENTS

Figure 1:
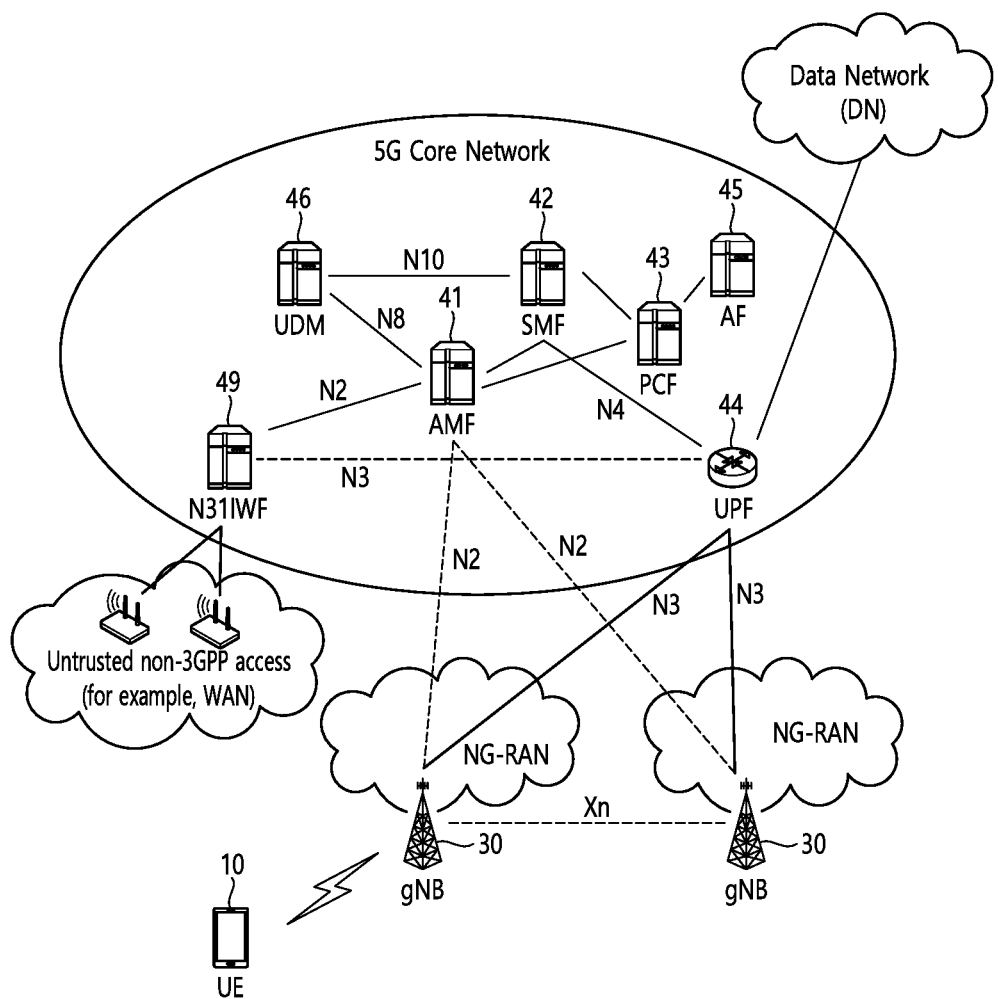
FIG. 1 illustrates a structure of the next generation mobile communication network.
Figure 2:
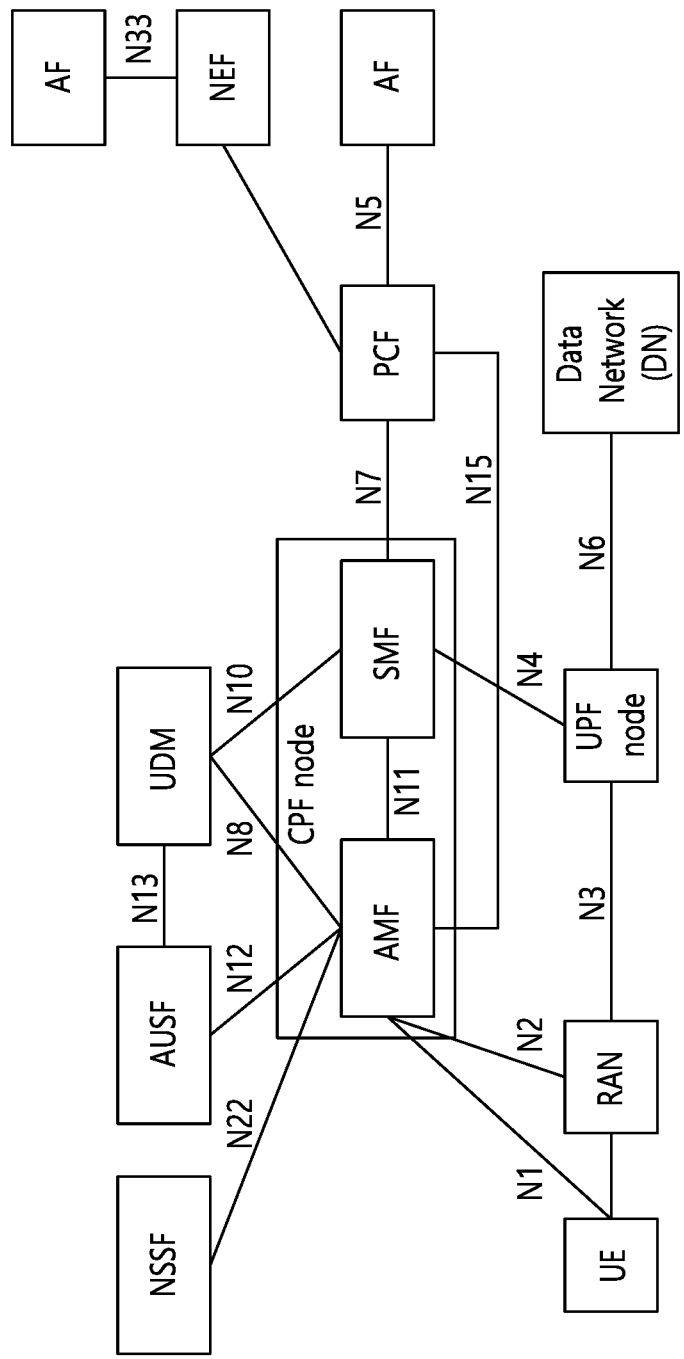
FIG. 2 illustrates an expected structure of the next generation mobile communication from the perspective of a node.
Figure 3:
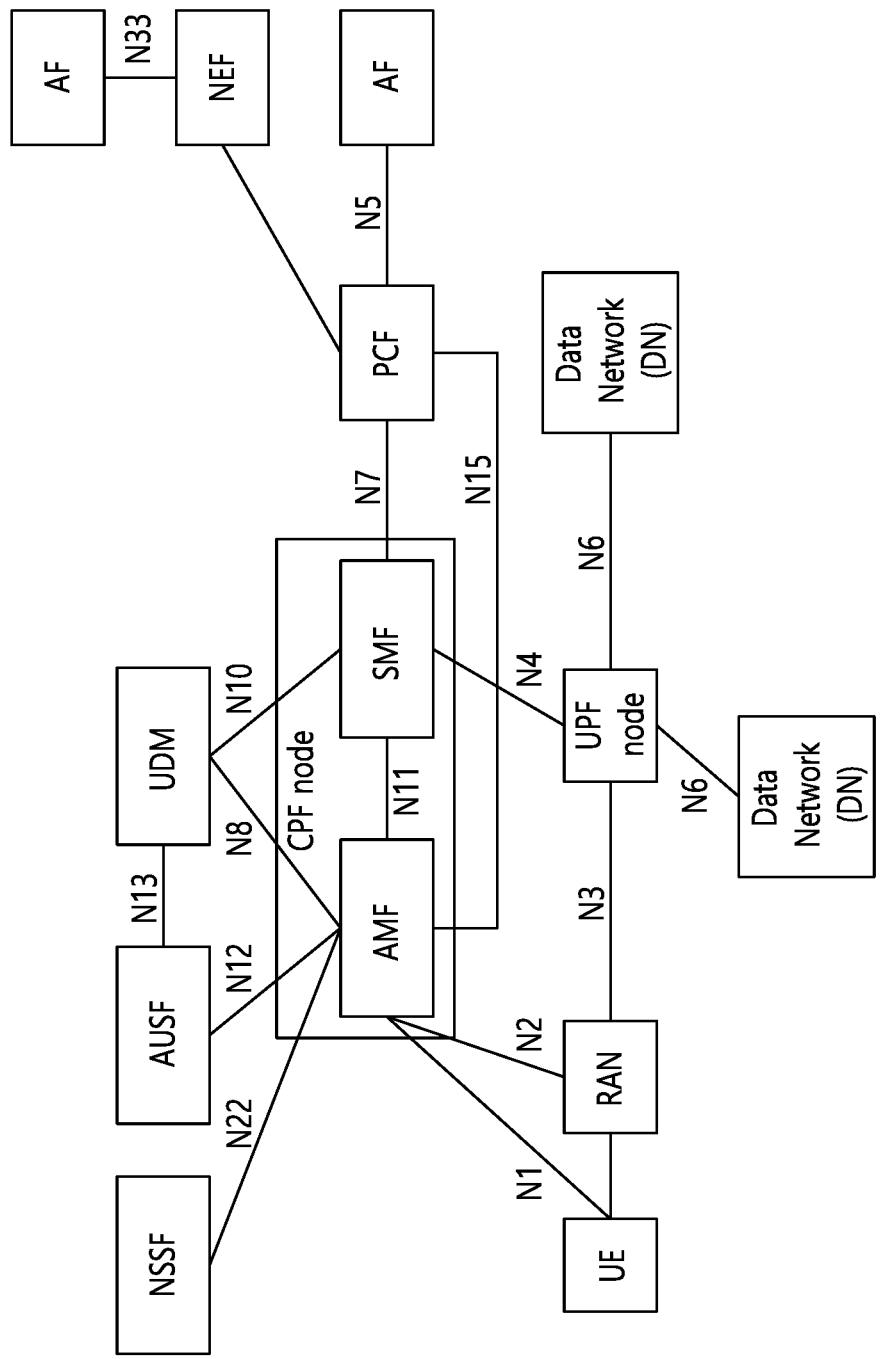
FIG. 3 illustrates an architecture for supporting simultaneous accesses to two data networks.
Figure 4:
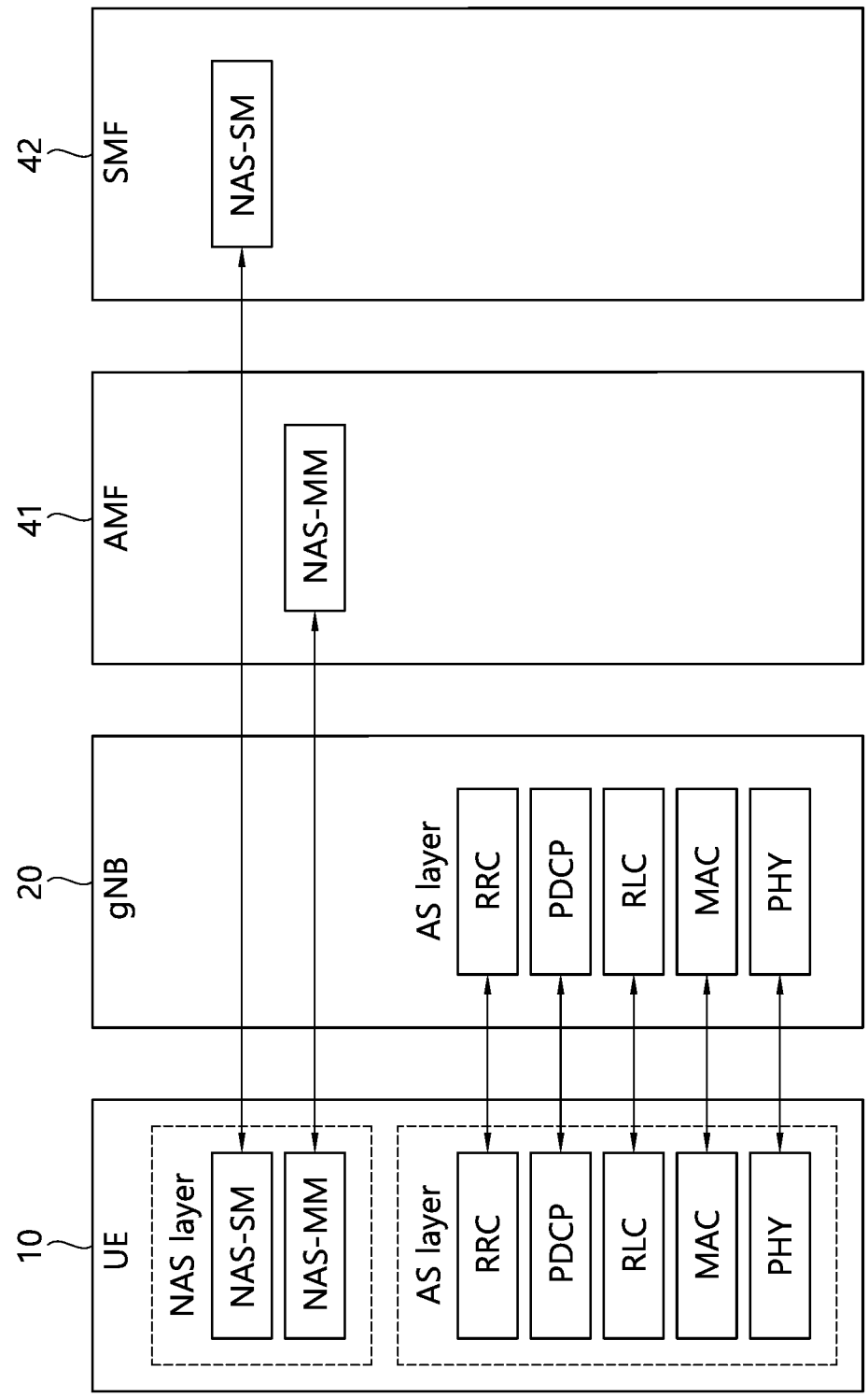
FIG. 4 illustrates a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

The expression "A or B" as used in the present disclosure may mean "only A", "only B" or "both A and B". In other words, "A or B" may be interpreted as "A and/or B" in the present disclosure. For example, in the present disclosure, "A, B or C" may mean "only A", "only B", "only C" or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B or C".

The phrase "at least one of A and B" as used in the present disclosure may mean "only A", "only B", or "both A and B". Also, the expression "at least one of A or B" or "at least one of A and/or B" may be interpreted to be the same as "at least one of A and B".

Also, the phrase "at least one of A, B and C" as used in the present disclosure may mean "only A", "only B", or "any combination of A, B and C". Also, the phrase "at least one of A, B or C" or "at least one of A, B and/or C" may mean "at least one of A, B and C".

Also, parentheses used in the present disclosure may mean "for example". More specifically, a phrase is written as "control information (PDCCH)", it may mean that "PDCCH" is proposed as one example of "control information". In other words, "control information" of the present disclosure is not limited to "PDCCH", but it may be interpreted that "PDCCH" is proposed as one example of "control information". Also, when a phrase is written as "control information (namely, PDCCH)", it may be interpreted that "PDCCH" is proposed as one example of "control information".

Technical features described individually in one figure of the present disclosure may be implemented separately or simultaneously.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<Registration Procedure>

In order to enable mobility tracking and data reception, and receive a service, a UE may need to be authorized. To this end, the UE needs to be registered in a network. The registration procedure is performed when the UE needs to perform initial registration with respect to a 5G system. In addition, the registration procedure is performed when the UE performs periodic registration update, when the UE moves to a new tracking area (TA) in an idle mode, and when the UE needs to perform periodic registration update.

During the initial registration procedure, ID of the UE may be obtained from the UE. the AMF may transmit PEI (IMEISV) to the UDM, the SMF, and the PCF.

Figure 5A:
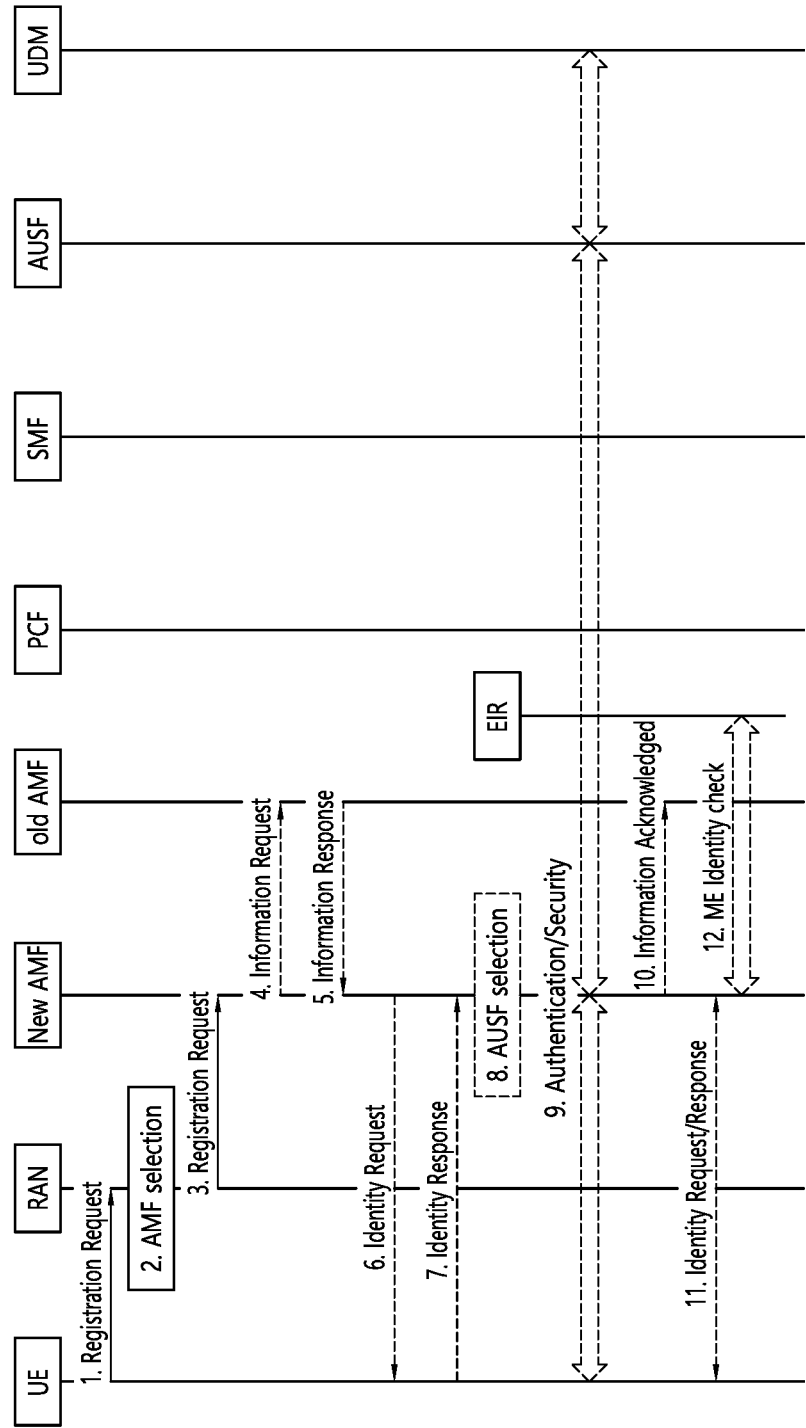
FIGS. 5a and 5b are signal flows of an exemplary registration procedure.
Figure 5B:
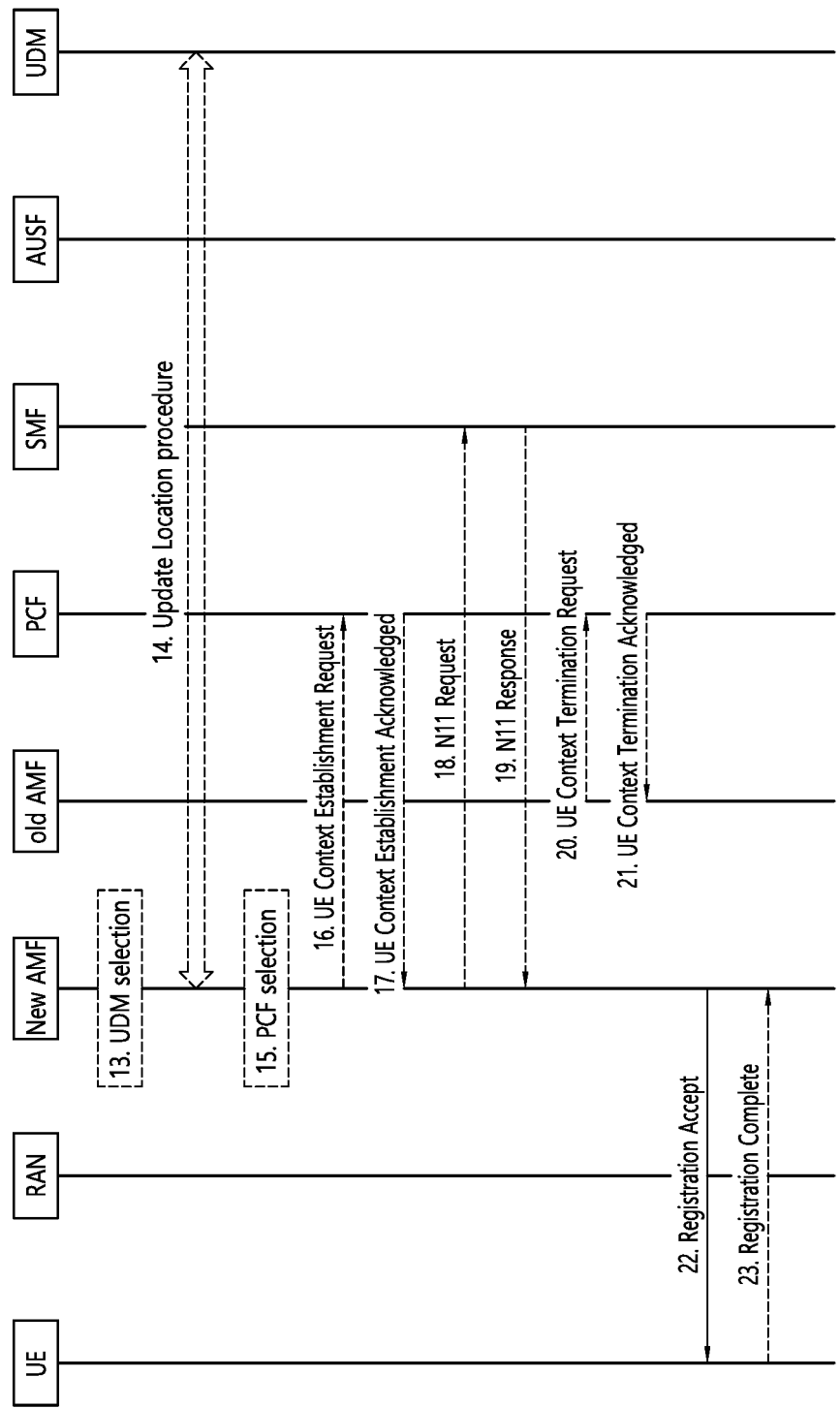

FIGS. 5a and 5b are signal flows of an exemplary registration procedure.

1) The UE may transmit an AN message to the RAN. the AN message may include an AN parameter and a registration request message. The registration request message may include information such as a registration type, a subscription permanent ID or a temporary user ID, a security parameter, Network Slice Selection Assistance Information (NSSAI), 5G capability of the UE, and a Protocol Data Unit (PDU) session state.

In the case of 5G RAN, the AN parameter may include a Subscription Permanent Identifier (SUPI) or a temporary user ID, a selected network, and NSSAI.

The registration type may indicate which state the UE is currently in among "initial registration" (namely, the UE is in a non-registered state), "mobility registration update" (namely, the UE is in a registered state and starts a registration procedure due to expiration of a periodic update timer), or "periodic registration update" (namely, the UE is in a registered state and starts a registration procedure due to expiration of a periodic update timer). If a temporary user ID is included, the temporary user ID represents the last serving AMF. If the UE has already been registered via non-3GPP access in a PLMN different from the PLMN of the 3GPP access, a temporary ID for the UE assigned by the AMF may not be provided while the UE performs the registration procedure via non-3GPP access.

The security parameter may be used for authentication and integrity protection.

The PDU session state may indicate a (previously established) PDU session available for the UE.

2) When SUPI is included or the temporary user ID does not indicate a valid AMF, the RAN may select an AMF based on (R)AT and NSSAI.

When the (R)AN is unable to select an appropriate AMF, an AMF is selected in a random fashion according to a local policy, and a registration request is forwarded to the selected AMF. If the selected AMF is unable to service the UE, the selected AMF selects another AMF that is more appropriate for the UE.

3) The RAN transmits an N2 message to the new AMF. The N2 message includes an N2 parameter and a registration request. The registration request may include a registration type, a subscription permanent ID or a temporary user ID, a security parameter, NSSAI, and MICO mode default configuration.

When 5G-RAN is used, the N2 parameter includes location information, cell identifier, and RAT type associated with the cell the UE is camping on.

If the registration type indicated by the UE is a periodic registration update, steps 4 to 17 to be described below may not be performed.

4) The newly selected AMF may transmit an information request message to the previous AMF.

If the temporary user ID of the UE is included in a registration request message and the serving AMF has changed since the last registration, the new AMF may transmit, to the previous AMF, an information request message including complete registration request information for requesting SUPI and MM context of the UE.

5) The previous AMF transmits an information response message to the newly selected AMF. The information response message may include SUPI, MM context, and SMF information.

Specifically, the previous AMF transmits an information response message including SUPI and MM context of the UE.

If the previous AMF has information on an active PDU session, the previous AMF may include SMF information including the ID of the SMF and a PDU session ID within the information response message.

6) The new AMF transmits an Identity Request message to the UE if SUPI is not provided by the UE or is not retrieved from the previous AME 7) The UE transmits an Identity Response message including the SUPI to the new AMF.

8) the AMF may decide to trigger an AUSF. In this case, the AMF may select an AUSF based on the SUPI.

9) The AUSF may start authentication of the UE and a NAS security function.

10) The new AMF may transmit an information response message to the previous AMF.

If the AMF has changed, the new AMF may transmit the information response message to confirm delivery of UE MM context.

If the authentication/security procedure fails, registration is rejected, and the new AMF may transmit a rejection message to the previous AMF.

11) The new AMF may transmit an Identity Request message to the UE.

If PEI has not been provided by the UE or has not been retrieved from the previous AMF, an Identity Request message may be transmitted so that the AMF may search for the PEI.

12) The new AMF checks the ME identifier.

13) If step 14 described below is performed, the new AMF selects the UDM based on the SUPI.

14) If the AMF has changed since the last registration, the AMF does not have valid subscription context for the UE, or the UE provides SUPI that is not looked up for valid context by the AMF, the new AMF starts the Update Location procedure. Alternatively, the Update Location procedure may be started when the UDM initiates Cancel Location for the previous AMF. The previous AMF discards the MM context and notifies as many SMFs as possible of the discarding, and the new AMF generates MM context for the UE after obtaining AMF-related subscription data from the UDM.

If network slicing is used, the AMF obtains allowed NSSAI based on requested NSSAI, UE subscription, and a local policy. If the AMF is not suitable for supporting the allowed NSSAI, the registration request is routed again.

15) The new AMF may select a PCF based on the SUPI.

16) The new AMF transmits a UE Context Establishment Request message to the PCF. the AMF may request an operator policy for the UE from the PCF.

17) The PCF transmits a UE Context Establishment Acknowledged message to the new AMF.

18) The new AMF transmits an N11 request message to the SMF.

Specifically, if the AMF is changed, the new AMF notifies each SMF of the new AMF that services the UE. the AMF verifies the PDU session state from the UE by using available SMF information. If the AMF has changed, the available SMF information may be received from the previous AME The new AMF may request the SMF to release a network resource associated with a PDU session not activated in the UE.

19) The new AMF transmits an N11 response message to the SMF.

20) The previous AMF transmits a UE Context Termination Request message to the PCF.

If the previous AMF has previously requested the UE context to be established in the PCF, the previous AMF may delete the UE context from the PCF.

21) The PCF may transmit a UE Context Termination Request message to the previous AMF.

22) The new AMF transmits a registration accept message to the UE. The registration accept message may include a temporary user ID, a registration area, mobility restriction, a PDU session state, NSSAI, a periodic registration update timer, and an allowed MICO mode.

The registration accept message may include allowed NSSAI and information of the mapped NSSAI. The allowed NSSAI on the access type of the UE may be included in an N2 message which includes the registration accept message. The mapped NSSAI is S-NSSAI of the allowed NSSAI mapped to S-NSSAI of NSSAI configured for an HPLMN.

When the AMF allocates a new temporary user ID, the temporary user ID may be further included in the registration accept message. When mobile restriction is applied to the UE, information indicating mobility restriction may be additionally included in the registration accept message. the AMF may include information indicating the PDU session state of the UE in the registration accept message. The UE may remove any internal resource associated with the PDU session not indicated as being active in a received PDU session state. If PDU session state information is included in the Registration Request, the AMF may include information indicating the PDU session state to the UE within the registration accept message.

23) The UE transmits a registration complete message to the new AMF.

<PDU Session Establishment Procedure>

There are two types of Protocol Data Unit (PDU) session establishment procedures as follows.

A PDU session establishment procedure initiated by a UE

A PDU session establishment procedure initiated by a network. To this end, the network may transmit a device trigger message to an application(s) of the UE.

Figure 6A:
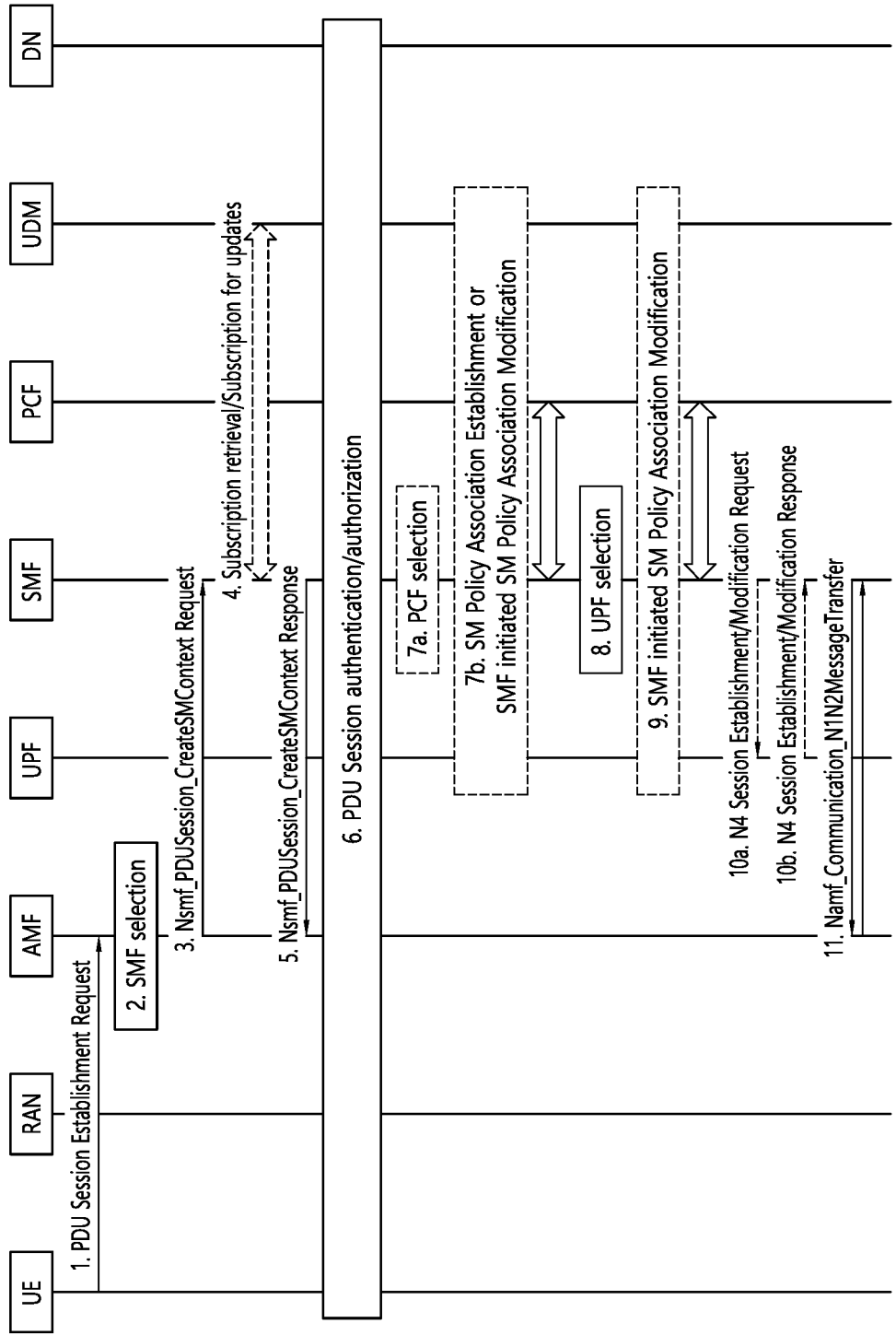
FIGS. 6a and 6b are signal flows of an exemplary PDU session establishment procedure.
Figure 6B:
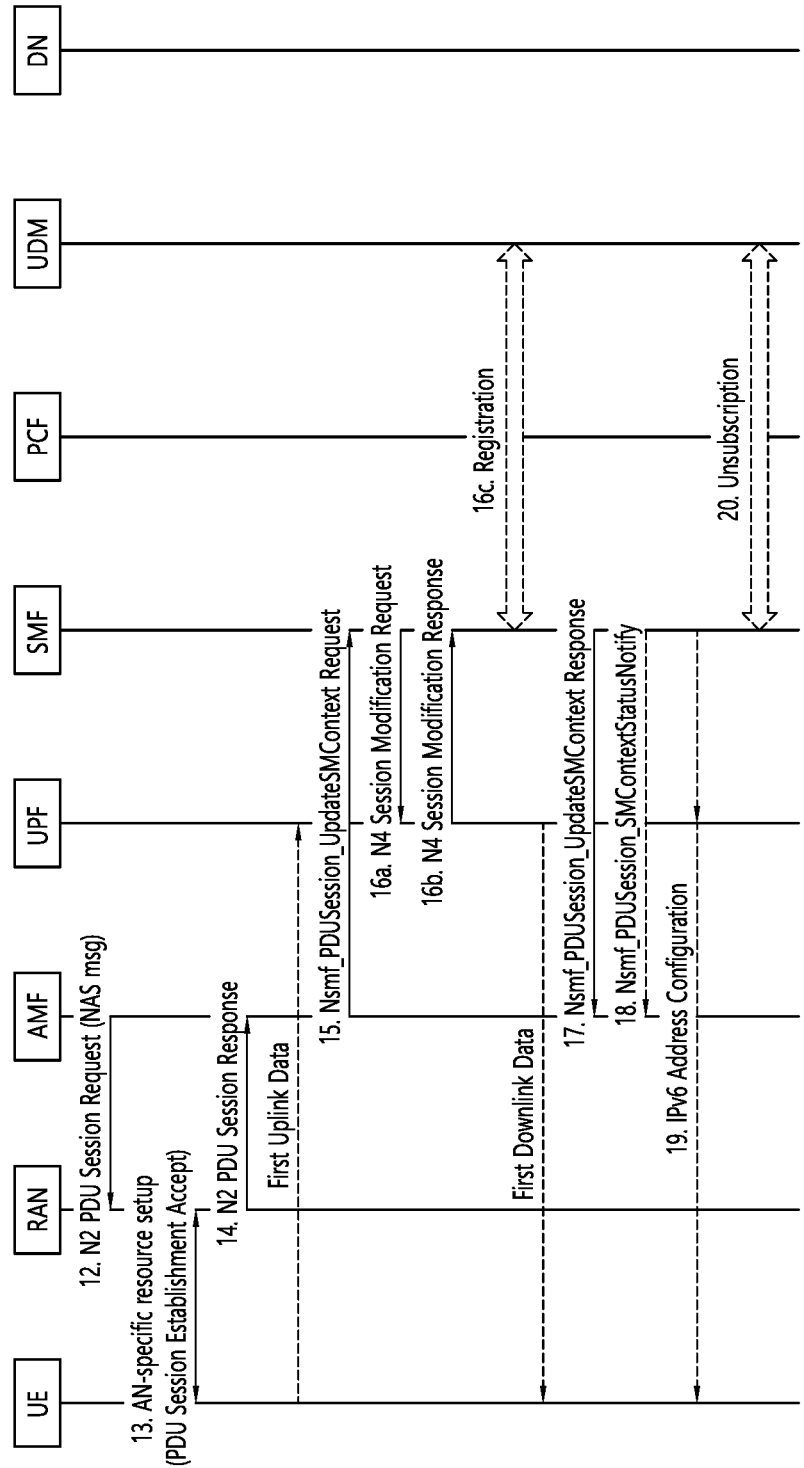

FIGS. 6a and 6b are signal flows of an exemplary PDU session establishment procedure.

The procedures shown in FIGS. 6a and 6b assume that the UE has already registered for the AMF according to the registration procedure described with reference to FIG. 5. Therefore, it is assumed that the AMF has already obtained user subscription data from the UDM.

1) The UE transmits a NAS Message (S-NSSAI(s), DNN (data network name), PDU Session ID, Request type, Old PDU Session ID, N1 SM container (PDU Session Establishment Request)) to AMF.

In order to establish a new PDU Session, the UE generates a new PDU Session ID.

The UE initiates the UE Requested PDU Session Establishment procedure by the transmission of a NAS message containing a PDU Session Establishment Request within the N1 SM container. The PDU Session Establishment Request includes a PDU session ID, Requested PDU Session Type, a Requested SSC mode, 5GSM Capability PCO, SM PDU DN Request Container, Number Of Packet Filters, UE Integrity Protection Maximum Data Rate, and optionally Always-on PDU Session Requested.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set.

When Emergency service is required and an Emergency PDU Session is not already established, a UE shall initiate the UE Requested PDU Session Establishment procedure with a Request Type indicating "Emergency Request".

The Request Type indicates "Emergency Request" if the PDU Session Establishment is a request to establish a PDU Session for Emergency services. The Request Type indicates "Existing Emergency PDU Session" if the request refers to an existing PDU Session for Emergency services switching between 3GPP access and non-3GPP access or to a PDU Session handover from an existing PDN connection for Emergency services in EPC.

The 5GSM Core Network Capability is provided by the UE and handled by SMF.

The Number Of Packet Filters indicates the number of supported packet filters for signaled QoS rules for the PDU Session that is being established. The number of packet filters indicated by the UE is valid for the lifetime of the PDU Session.

The UE Integrity Protection Maximum Data Rate indicates the maximum data rate up to which the UE can support UP integrity protection. The UE shall provide the UE Integrity Protection Data Rate capability independently of the access Type over which the UE sends the PDU Session Establishment Request.

The NAS message sent by the UE is encapsulated by the AN in a N2 message towards the AMF that should include User location information and Access Type Information.

The PDU Session Establishment Request message may contain SM PDU DN Request Container containing information for the PDU Session authorization by the external DN.

The UE includes the S-NSSAI from the allowed NSSAI of the current access type. If the Mapping of Allowed NSSAI was provided to the UE, the UE shall provide both the S-NSSAI of the VPLMN from the allowed NSSAI and the corresponding S-NSSAI of the HPLMN from the Mapping Of Allowed NSSAI.

If the procedure is triggered for SSC mode 3 operation, the UE shall also include the Old PDU Session ID which indicates the PDU Session ID of the on-going PDU Session to be released, in NAS message. The Old PDU Session ID is an optional parameter which is included only in this case.

the AMF receives from the AN the NAS SM message (built in step 1) together with User Location Information (e.g. Cell Id in the case of the NG-RAN).

The UE shall not trigger a PDU Session establishment for a PDU Session corresponding to a LADN when the UE is outside the area of availability of the LADN.

If the UE is establishing a PDU session for IMS, and the UE is configured to discover the P-CSCF address during connectivity establishment, the UE shall include an indicator that it requests a P CSCF IP address(es) within the SM container.

The PS Data Off status is included in the PCO in the PDU Session Establishment Request message.

If the UE requests to establish always-on PDU session, the UE includes an Always-on PDU Session Requested indication in the PDU Session Establishment Request message.

2) the AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI of the HPLMN for the requested PDU Session either according to the UE subscription, if it contains only one default S-NSSAI, or based on operator policy and, in the case of LBO, an S-NSSAI of the Serving PLMN which matches the S-NSSAI of the HPLMN. When the NAS Message contains an S-NSSAI of the Serving PLMN but it does not contain a data network name (DNN), the AMF determines the DNN for the requested PDU Session by selecting the default DNN for this S-NSSAI if the default DNN is present in the UE's Subscription Information (or for the corresponding S-NSSAI of the HPLMN, in the case of LBO); otherwise the serving AMF selects a locally configured DNN for this S-NSSAI of the Serving PLMN. If the AMF cannot select an SMF (e.g. the UE provided DNN is not supported by the network, or the UE provided DNN is not in the Subscribed DNN List for the S-NSSAI (or its mapped value for the HPLMN in the case of LBO) and wildcard DNN is not included in the Subscribed DNN list), the AMF shall reject the NAS Message containing PDU Session Establishment Request from the UE with an appropriate cause The AMF selects an SMF. If the Request Type indicates "Initial request" or the request is due to handover from EPS or from non-3GPP access serving by a different AMF, the AMF stores an association of the S-NSSAI(s), the DNN, the PDU Session ID, the SMF ID as well as the access Type of the PDU Session.

If the Request Type is "initial request" and if the Old PDU Session ID indicating the existing PDU Session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The case where the Request Type indicates "Existing PDU Session", and either the AMF does not recognize the PDU Session ID or the subscription context that the AMF received from UDM during the Registration or Subscription Profile Update Notification procedure does not contain an SMF ID corresponding to the PDU Session ID constitutes an error case. the AMF updates the access Type stored for the PDU Session.

If the Request Type indicates "Existing PDU Session" referring to an existing PDU Session moved between 3GPP access and non-3GPP access, then if the Serving PLMN S-NSSAI of the PDU Session is present in the allowed NSSAI of the target access type, the PDU Session Establishment procedure can be performed in the following cases:

the SMF ID corresponding to the PDU Session ID and the AMF belong to the same PLMN;

the SMF ID corresponding to the PDU Session ID belongs to the HPLMN;

Otherwise the AMF shall reject the PDU Session Establishment Request with an appropriate reject cause.

The SMF ID includes the PLMN ID that the SMF belongs to.

the AMF shall reject a request coming from an Emergency Registered UE and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead. the AMF stores the access Type of the PDU Session.

If the Request Type indicates "Emergency Request" or "Existing Emergency PDU Session", the AMF selects the SMF.

3) the AMF transmit, to SMF: Either Nsmf_PDUSession_CreateSMContext Request (SUPI, DNN, S-NSSAI(s), PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode, Trace Requirements) or Nsmf_PDUSession_UpdateSMContext Request (SUPI, DNN, S-NSSAI(s), SM Context ID, AMF ID, Request Type, N1 SM container (PDU Session Establishment Request), User location information, Access Type, RAT type, PEI).

If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request.

The AMF sends the S-NSSAI of the Serving PLMN from the allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. the AMF forwards the PDU Session ID together with the N1 SM container containing the PDU Session Establishment Request received from the UE. The GPSI shall be included if available at AME The AMF determines Access Type and RAT Type based on the Global RAN Node ID associated with the N2 interface.

The AMF provides the PEI instead of the SUPI when the UE in limited service state has registered for Emergency services (i.e. Emergency Registered) without providing a SUPI. If the UE in limited service state has registered for Emergency services (i.e. Emergency Registered) with a SUPI but has not been authenticated the AMF indicates that the SUPI has not been authenticated. The SMF determines that the UE has not been authenticated when it does not receive a SUPI for the UE or when the AMF indicates that the SUPI has not been authenticated.

If the AMF determines that the DNN corresponds to an LADN then the AMF provides the "UE presence in LADN service area" that indicates if the UE is IN or OUT of the LADN service area.

If the Old PDU Session ID is included in step 1, and if the SMF is not to be reallocated, the AMF also includes Old PDU Session ID in the Nsmf_PDUSession_CreateSMContext Request.

DNN Selection Mode is determined by the AMF. It indicates whether an explicitly subscribed DNN has been provided by the UE in its PDU Session Establishment Request.

The SMF may use DNN Selection Mode when deciding whether to accept or reject the UE request.

When the Establishment cause received as part of AN parameters during the Registration procedure or Service Request procedure is associated with priority services (e.g. MPS, MCS), the AMF includes a Message Priority header to indicate priority information. The SMF uses the Message Priority header to determine if the UE request is subject to exemption from NAS level congestion control. Other NFs relay the priority information by including the Message Priority header in service-based interfaces.

In the local breakout case, if the SMF (in the VPLMN) is not able to process some part of the N1 SM information that Home Routed Roaming is required, and the SMF responds to the AMF that it is not the right SMF to handle the N1 SM message by invoking Nsmf_PDUSession_CreateSMContext Response service operation. The SMF includes a proper N11 cause code triggering the AMF to proceed with home routed (HR) case.

the AMF may include a PCF ID in the Nsmf_PDUSession_CreateSMContext Request. This PCF ID identifies the H-PCF in the non-roaming case and the V-PCF in the local breakout roaming case.

The AMF includes Trace Requirements if Trace Requirements have been received in subscription data.

4) If Session Management Subscription data for corresponding SUPI, DNN and S-NSSAI of the HPLMN is not available, then SMF retrieves the Session Management Subscription data using Nudm_SDM_Get (SUPI, Session Management Subscription data, DNN, S-NSSAI of the HPLMN) and subscribes to be notified when this subscription data is modified using Nudm_SDM_Subscribe (SUPI, Session Management Subscription data, DNN, S-NSSAI of the HPLMN). UDM may get this information from UDR by Nudr_DM_Query (SUPI, Subscription Data, Session Management Subscription data, DNN, S-NSSAI of the HPLMN) and may subscribe to notifications from UDR for the same data by Nudr_DM_subscribe.

The SMF may use DNN Selection Mode when deciding whether to retrieve the Session Management Subscription data e.g. If the (DNN, S-NSSAI of the HPLMN) is not explicitly subscribed, the SMF may use local configuration instead of Session Management Subscription data.

If the Request Type in step 3 indicates "Existing PDU Session" or "Existing Emergency PDU Session" the SMF determines that the request is due to switching between 3GPP access and non-3GPP access or due to handover from EPS. The SMF identifies the existing PDU Session based on the PDU Session ID. In such a case, the SMF does not create a new SM context but instead updates the existing SM context and provides the representation of the updated SM context to the AMF in the response.

If the Request Type is "Initial request" and if the Old PDU Session ID is included in Nsmf_PDUSession_CreateSM- Context Request, the SMF identifies the existing PDU Session to be released based on the Old PDU Session ID.

Subscription data includes the allowed PDU Session Type(s), Allowed SSC mode(s), default 5QI and ARP, subscribed Session-AMBR.

Static IP address/prefix may be included in the subscription data if the UE has subscribed to it.

The SMF checks the validity of the UE request: it checks

Whether the UE request is compliant with the user subscription and with local policies;

(If the DNN corresponds to an LADN), whether the UE is located within the LADN service area based on the "UE presence in LADN service area" indication from the AMF. If the AMF does not provide the "UE presence in LADN service area" indication and the SMF determines that the DNN corresponds to a LADN, then the SMF considers that the UE is OUT of the LADN service area If the UE request is considered as not valid, the SMF decides to not accept to establish the PDU Session.

5) From SMF to AMF: Either Nsmf_PDUSession_CreateSMContext Response (Cause, SM Context ID or N1 SM container (PDU Session Reject (Cause))) or an Nsmf_PDUSession_UpdateSMContext Response depending on the request received in step 3.

If the SMF received Nsmf_PDUSession_CreateSMContext Request in step 3 and the SMF is able to process the PDU Session establishment request, the SMF creates an SM context and responds to the AMF by providing an SM Context ID.

If the UP Security Policy for the PDU Session is determined to have Integrity Protection set to "Required", the SMF may, based on local configuration, decide whether to accept or reject the PDU Session request based on the UE Integrity Protection Maximum Data Rate.

The SMF can e.g. be configured to reject a PDU Session if the UE Integrity Protection Maximum Data Rate has a very low value, if the services provided by the DN would require higher bitrates.

When the SMF decides to not accept to establish a PDU Session, the SMF rejects the UE request via NAS SM signaling including a relevant SM rejection cause by responding to the AMF with Nsmf_PDUSession_CreateSMContext Response. The SMF also indicates to the AMF that the PDU Session ID is to be considered as released, the SMF proceeds to step 20 and the PDU Session Establishment procedure is stopped.

6) Optional Secondary authentication/authorization.

If the Request Type in step 3 indicates "Existing PDU Session", the SMF does not perform secondary authentication/authorization.

If the Request Type received in step 3 indicates "Emergency Request" or "Existing Emergency PDU Session", the SMF shall not perform secondary authentication\authorization.

If the SMF needs to perform secondary authentication/authorization during the establishment of the PDU Session by a DN-AAA server, the SMF triggers the PDU Session establishment authentication/authorization.

7a) If dynamic PCC is to be used for the PDU Session, the SMF performs PCF selection. If the Request Type indicates "Existing PDU Session" or "Existing Emergency PDU Session", the SMF shall use the PCF already selected for the PDU Session.

Otherwise, the SMF may apply local policy.

7b) The SMF may perform an SM Policy Association Establishment procedure to establish an SM Policy Association with the PCF and get the default PCC Rules for the PDU Session. The GPSI shall be included if available at SMF. If the Request Type in step 3 indicates "Existing PDU Session", the SMF may provide information on the Policy Control Request Trigger condition(s) that have been met by an SMF initiated SM Policy Association Modification procedure. The PCF may provide policy information to SMF.

The PCF, based on the Emergency DNN, sets the ARP of the PCC rules to a value that is reserved for Emergency services.

The purpose of step 7 is to receive PCC rules before selecting UPF. If PCC rules are not needed as input for UPF selection, step 7 can be performed after step 8.

8) If the Request Type in step 3 indicates "Initial request", the SMF selects an SSC mode for the PDU Session. The SMF also selects one or more UPFs as needed. In the case of PDU Session Type IPv4 or IPv6 or IPv4v6, the SMF allocates an IP address/prefix for the PDU Session. In the case of PDU Session Type IPv6 or IPv4v6, the SMF also allocates an interface identifier to the UE for the UE to build its link-local address. For Unstructured PDU Session Type the SMF may allocate an IPv6 prefix for the PDU Session and N6 point-to-point tunneling (based on UDP/IPv6). For Ethernet PDU Session Type, neither a MAC nor an IP address is allocated by the SMF to the UE for this PDU Session.

If the Request Type in Step 3 is "Existing PDU Session", the SMF maintains the same IP address/prefix that has already been allocated to the UE in the source network.

If the Request Type in step 3 indicates "Existing PDU Session" referring to an existing PDU Session moved between 3GPP access and non-3GPP access the SMF maintains the SSC mode of the PDU Session, the current PDU Session Anchor and IP address.

The SMF may decide to trigger e.g. new intermediate UPF insertion or allocation of a new UPF.

If the Request Type indicates "Emergency Request", the SMF selects the UPF and selects SSC mode 1.

9) SMF may perform an SMF initiated SM Policy Association Modification procedure to provide information on the Policy Control Request Trigger condition(s) that have been met. If Request Type is "initial request" and dynamic PCC is deployed and PDU Session Type is IPv4 or IPv6 or IPv4v6, SMF notifies the PCF (if the Policy Control Request Trigger condition is met) with the allocated UE IP address/prefix(es).

When PCF is deployed, the SMF shall further report the PS Data Off status to PCF if the PS Data Off Policy Control Request Trigger is provisioned, the additional behaviour of SMF and PCF for 3GPP PS Data Off is defined.

If an IP address/prefix has been allocated before step 7 (e.g. subscribed static IP address/prefix in UDM/UDR) or the step 7 is perform after step 8, the IP address/prefix can be provided to PCF in step 7, and the IP address/prefix notification in this step can be skipped.

PCF may provide updated policies to the SME The PCF may provide policy information to SMF.

10) If Request Type indicates "initial request", the SMF initiates an N4 Session Establishment procedure with the selected UPF, otherwise it initiates an N4 Session Modification procedure with the selected UPF:

10a) The SMF sends an N4 Session Establishment/Modification Request to the UPF and provides Packet detection, enforcement and reporting rules to be installed on the UPF for this PDU Session. If CN Tunnel Info is allocated by the SMF, the CN Tunnel Info is provided to UPF in this step. If the selective User Plane deactivation is required for this PDU Session, the SMF determines the Inactivity Timer and provides it to the UPF. The SMF provides Trace Requirements to the UPF if it has received Trace Requirements.

10b) The UPF acknowledges by sending an N4 Session Establishment/Modification Response. If CN Tunnel Info is allocated by the UPF, the CN Tunnel Info is provided to SMF in this step.

If multiple UPFs are selected for the PDU Session, the SMF initiate N4 Session Establishment/Modification procedure with each UPF of the PDU Session in this step.

If the Request Type indicates "Existing PDU Session", and the SMF creates CN Tunnel Info, then this step is skipped. Otherwise, this step is performed to obtain the CN Tunnel Info from the UPF using the N4 Session Modification Procedure.

11) SMF to AMF: Namf_Communication_N1N2MessageTransfer (PDU Session ID, N2 SM information (PDU Session ID, QFI(s), QoS Profile(s), CN Tunnel Info, S-NSSAI from the allowed NSSAI, Session-AMBR, PDU Session Type, User Plane Security Enforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es), [Always-on PDU Session]))). If multiple UPFs are used for the PDU Session, the CN Tunnel Info contain tunnel information related with the UPF that terminates N3.

The N2 SM information carries information that the AMF shall forward to the (R)AN which includes:

The CN Tunnel Info corresponds to the Core Network address of the N3 tunnel corresponding to the PDU Session.

One or multiple QoS profiles and the corresponding QFIs can be provided to the (R)AN.

The PDU Session ID may be used by AN signaling with the UE to indicate to the UE the association between (R)AN resources and a PDU Session for the UE.

A PDU Session is associated to an S-NSSAI of the HPLMN and, if applicable, to a S-NSSAI of the VPLMN, and a DNN. The S-NSSAI provided to the (R)AN, is the S-NSSAI with the value for the Serving PLMN (i.e. the HPLMN S-NSSAI or, in LBO roaming case, the VPLMN S-NSSAI).

User Plane Security Enforcement information is determined by the SMF,

If the User Plane Security Enforcement information indicates that Integrity Protection is "Preferred" or "Required", the SMF also includes the UE Integrity Protection Maximum Data Rate as received in the PDU Session Establishment Request.

The N1 SM container contains the PDU Session Establishment Accept that the AMF shall provide to the UE. If the UE requested P-CSCF discovery then the message shall also include the P-CSCF IP address(es) as determined by the SMF. The PDU Session Establishment Accept includes S-NSSAI from the allowed NSSAI. For LBO roaming scenario, the PDU Session Establishment Accept includes the S-NSSAI from the allowed NSSAI for the VPLMN and also it includes the corresponding S-NSSAI of the HPLMN from the Mapping Of Allowed NSSAI that SMF received in step 3. If the PDU Session being established was requested to be an always-on PDU Session, the SMF shall indicate whether the request is accepted by including an Always-on PDU Session Granted indication in the PDU Session Establishment Accept message. If the PDU Session being established was not requested to be an always-on PDU Session but the SMF determines that the PDU Session needs to be established as an always-on PDU Session, the SMF shall include an Always-on PDU Session Granted indication in the PDU Session Establishment Accept message indicating that the PDU session is an always-on PDU Session.

Multiple QoS Rules, QoS Flow level QoS parameters if needed for the QoS Flow(s) associated with those QoS rule(s) and QoS Profiles may be included in the PDU Session Establishment Accept within the N1 SM and in the N2 SM information.

The Namf_Communication_N1N2MessageTransfer contains the PDU Session ID allowing the AMF to know which access towards the UE to use.

If the PDU session establishment failed anywhere between step 5 and step 11, then the Namf_Communication_N1N2MessageTransfer request shall include the N1 SM container with a PDU Session Establishment Reject message and shall not include any N2 SM container. The (R)AN sends the NAS message containing the PDU Session Establishment Reject to the UE. In this case, steps 12-17 are skipped.

12) AMF to (R)AN: N2 PDU Session Request (N2 SM information, NAS message (PDU Session ID, N1 SM container (PDU Session Establishment Accept))).

the AMF sends the NAS message containing PDU Session ID and PDU Session Establishment Accept targeted to the UE and the N2 SM information received from the SMF within the N2 PDU Session Request to the (R)AN.

13) (R)AN to UE: The (R)AN may issue AN specific signaling exchange with the UE that is related with the information received from SMF. For example, in the case of a NG-RAN, an RRC Connection Reconfiguration may take place with the UE establishing the necessary NG-RAN resources related to the QoS Rules for the PDU Session request received in step 12.

(R)AN also allocates (R)AN N3 Tunnel Info for the PDU Session. In the case of Dual Connectivity, the Master RAN node may assign some (zero or more) QFIs to be setup to a Master RAN node and others to the Secondary RAN node. the AN Tunnel Info includes a tunnel endpoint for each involved (R)AN node, and the QFIs assigned to each tunnel endpoint. A QFI can be assigned to either the Master RAN node or the Secondary RAN node and not to both.

(R)AN forwards the NAS message (PDU Session ID, N1 SM container (PDU Session Establishment Accept)) provided in step 12 to the UE. (R)AN shall only provide the NAS message to the UE if the AN specific signaling exchange with the UE includes the (R)AN resource additions associated to the received N2 command.

If MICO mode is active and the NAS message Request Type in step 1 indicated "Emergency Request", then the UE and the AMF shall locally deactivate MICO mode.

14) (R)AN to AMF: N2 PDU Session Response (PDU Session ID, Cause, N2 SM information (PDU Session ID, AN Tunnel Info, List of accepted/rejected QFI(s), User Plane Enforcement Policy Notification)).

The AN Tunnel Info corresponds to the access Network address of the N3 tunnel corresponding to the PDU Session.

If the (R)AN rejects QFI(s) the SMF is responsible of updating the QoS rules and QoS Flow level QoS parameters if needed for the QoS Flow associated with the QoS rule(s) in the UE accordingly.

The NG-RAN rejects the establishment of UP resources for the PDU Session when it cannot fulfill User Plane Security Enforcement information with a value of Required.

The NG-RAN notifies the SMF when it cannot fulfill a User Plane Security Enforcement with a value of Preferred.

15) AMF to SMF: Nsmf_PDUSession_UpdateSMContext Request (SM Context ID, N2 SM information, Request Type).

the AMF forwards the N2 SM information received from (R)AN to the SMF.

If the list of rejected QFI(s) is included in N2 SM information, the SMF shall release the rejected QFI(s) associated QoS profiles.

If the User Plane Enforcement Policy Notification in the N2 SM information indicates that no user plane resources could be established, and the User Plane Enforcement Policy indicated "required", the SMF shall reject the PDU session establishment by including a N1 SM container with a PDU Session Establishment Reject message in the Nsmf_PDUSession_UpdateSMContext Response in step 17. Step 16 is skipped in this case.

16a) The SMF initiates an N4 Session Modification procedure with the UPF. The SMF provides AN Tunnel Info to the UPF as well as the corresponding forwarding rules.

NOTE 7: If the PDU Session Establishment Request was due to mobility between 3GPP and non-3GPP access or mobility from EPC, the downlink data path is switched towards the target access in this step.

16b) The UPF provides an N4 Session Modification Response to the SMF.

If multiple UPFs are used in the PDU Session, the UPF in step 16 refers to the UPF terminating N3.

After this step, the UPF delivers any down-link packets to the UE that may have been buffered for this PDU Session.

16c) If Request Type in step 3 indicates neither "Emergency Request" nor "Existing Emergency PDU Session" and, if the SMF has not yet registered for this PDU Session, then the SMF registers with the UDM using Nudm_UECM_Registration (SUPI, DNN, PDU Session ID, SMF Identity) for a given PDU Session. As a result, the UDM stores following information: SUPI, SMF identity and the associated DNN and PDU Session ID. The UDM may further store this information in UDR by Nudr_DM_Update (SUPI, Subscription Data, UE context in SMF data).

If the Request Type received in step 3 indicates "Emergency Request":

For an authenticated non-roaming UE, based on operator configuration (e.g. related with whether the operator uses a fixed SMF for Emergency calls, etc.), the SMF may register in the UDM using Nudm_UECM_Registration (SUPI, PDU Session ID, SMF identity, Indication of Emergency Services) for a given PDU Session that is applicable for emergency services. As a result, the UDM shall store the applicable PDU Session for Emergency services.

For an unauthenticated UE or a roaming UE, the SMF shall not register in the UDM for a given PDU Session.

17) SMF to AMF: Nsmf_PDUSession_UpdateSMContext Response (Cause).

The SMF may subscribe to the UE mobility event notification from the AMF (e.g. location reporting, UE moving into or out of Area Of Interest), after this step by invoking Namf_EventExposure_Subscribe service operation. For LADN, the SMF subscribes to the UE moving into or out of LADN service area event notification by providing the LADN DNN as an indicator for the area Of Interest.

After this step, the AMF forwards relevant events subscribed by the SMF.

18) SMF to AMF: Nsmf_PDUSession_SMContextStatusNotify (Release)

If during the procedure, any time after step 5, the PDU Session establishment is not successful, the SMF informs the AMF by invoking Nsmf_PDUSession_SMContextStatusNotify (Release). The SMF also releases any N4 session(s) created, any PDU Session address if allocated (e.g. IP address) and releases the association with PCF, if any. In this case, step 19 is skipped.

19) SMF to UE, via UPF: In the case of PDU Session Type IPv6 or IPv4v6, the SMF generates an IPv6 Router Advertisement and sends it to the UE via N4 and the UPF.

20) If the PDU Session establishment failed after step 4, the SMF shall perform the following:

The SMF unsubscribes to the modifications of Session Management Subscription data for the corresponding (SUPI, DNN, S-NSSAI of the HPLMN), using Nudm_SDM_Unsubscribe (SUPI, Session Management Subscription data, DNN, S-NSSAI of the HPLMN), if the SMF is no more handling a PDU Session of the UE for this (DNN, S-NSSAI of the HPLMN). The UDM may unsubscribe to the modification notification from UDR by Nudr_DM_Unsubscribe (SUPI, Subscription Data, Session Management Subscription data, S-NSSAI of the HPLMN, DNN).

<Redundant PDU Sessions>

In order to support highly reliable URLLC services, a UE may set up two redundant PDU Sessions over the 5G network, such that the 5G network sets up the user plane paths of the two redundant PDU Sessions to be disjoint. Based on the policies provided by PCF for the PDU Session, combination of the S-NSSAI, DNN, user subscription and local policy configuration, the SMF determines whether the PDU Session is to be handled redundantly. In case the SMF determines that redundant handling is allowed and possible for the given PDU Session, the SMF selects the value of Redundancy Sequence Number (RSN) to indicate to NG-RAN that redundant user plane resources shall be provided for the given PDU sessions by means of dual connectivity. Based on the RSN and RAN configuration, the NG-RAN sets up dual connectivity so that the sessions have end to end redundant paths.

<Problem to be Solved by the Present Disclosure>

Figure 7:
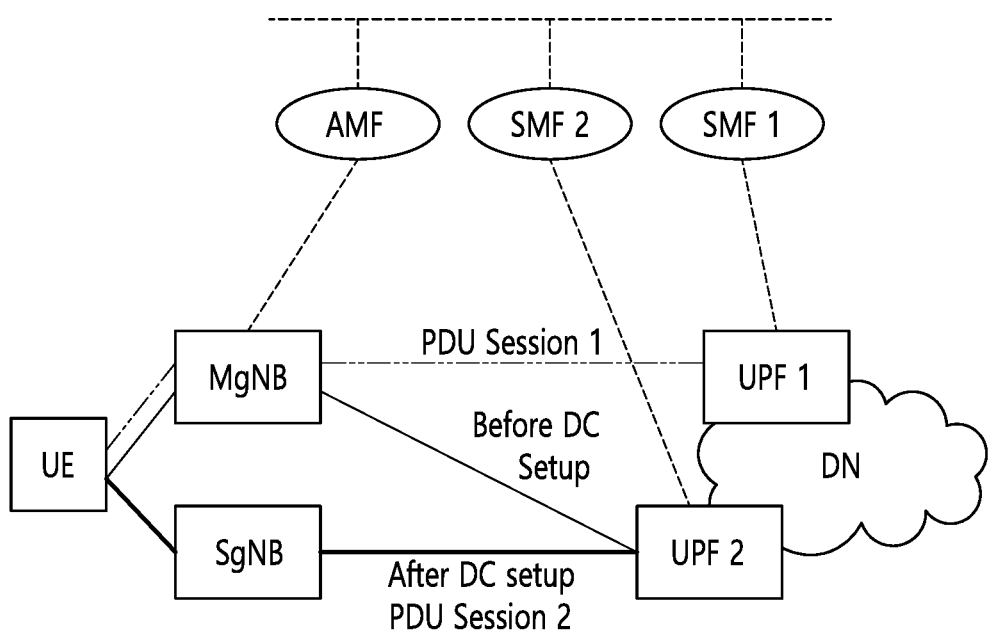
FIG. 7 shows an example scenario for redundant PDU session establishment when multiple SMFs are used.

FIG. 7 shows an example scenario for redundant PDU session establishment when multiple SMFs are used.

As shown in FIG. 7, there may be occurred the problem in case two redundant PDU sessions are handled via different SMFs. Initially, the two PDU Sessions are established at the same NG-RAN. Based on different RSN values from each SMF, the NG-RAN initiates to set up the dual connectivity for redundant transmission. However, if two SMFs allocate the same RSN for two redundant PDU sessions, the NG-RAN is difficult to differentiate the PDU Sessions that are handled redundantly. Therefore, both PDU sessions may be handled by same NG-RAN without redundancy handling. To avoid this problem, the SMFs need to be configured to have different RSN value.

In addition, the NG-RAN needs to know the information on which PDU session is associated to each other for redundant transmission. This is because the NG-RAN should provide redundant user plane resources for duplicated PDU sessions. However, in case two redundant PDU sessions are handled via different SMFs, each SMF is difficult to know the PDU session ID which is handled by the other SMF. Therefore, it needs to consider how to provide to the NG-RAN the PDU session pair ID duplicated for the redundant transmission.

<Disclosure of the Present Disclosure>

The present disclosure is intended to provide solutions to solve the above-explained problems.

The disclosures of the present disclosure described below may be implemented by one or more combinations. Although each drawing illustrates an embodiment of each disclosure, embodiments in the drawing may be combined to be implemented.

Figure 8A:
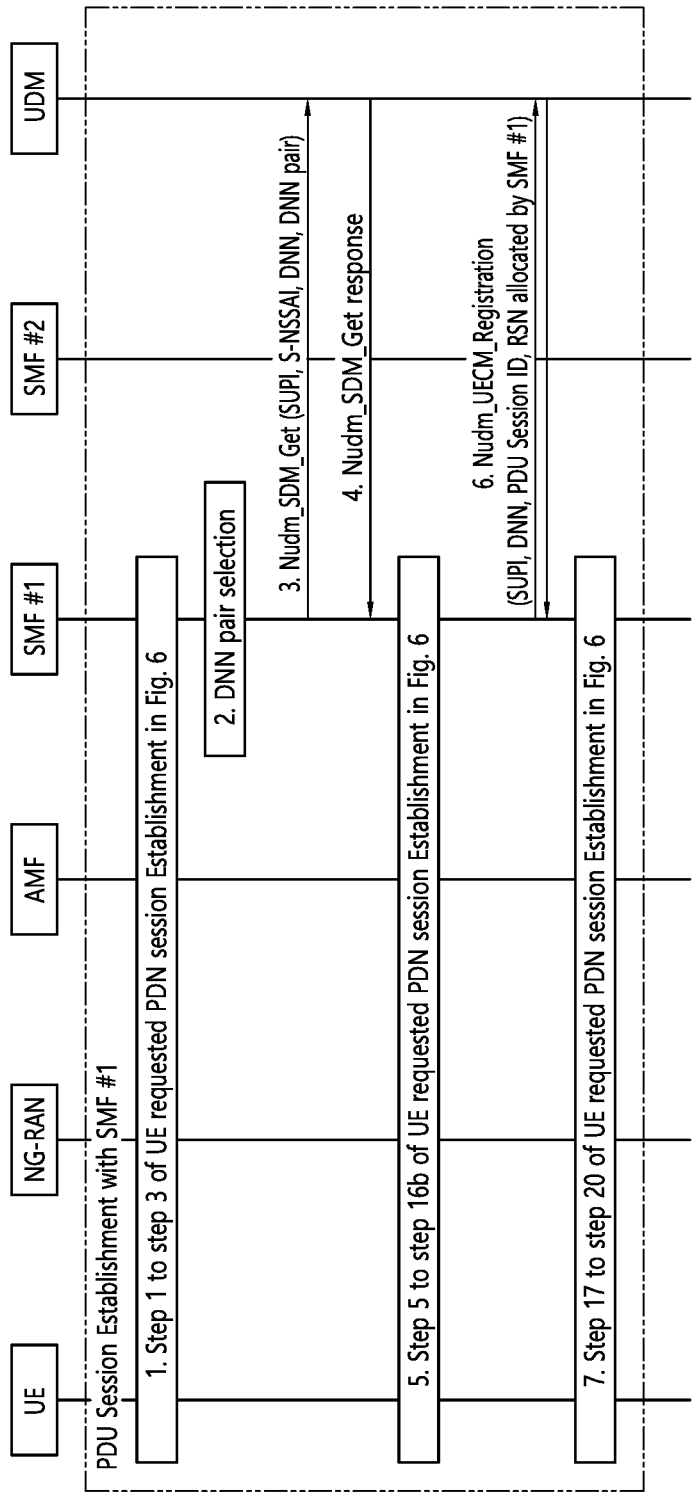
FIGS. 8a and 8b show a first exemplary solution of the present disclosure.
Figure 8B:
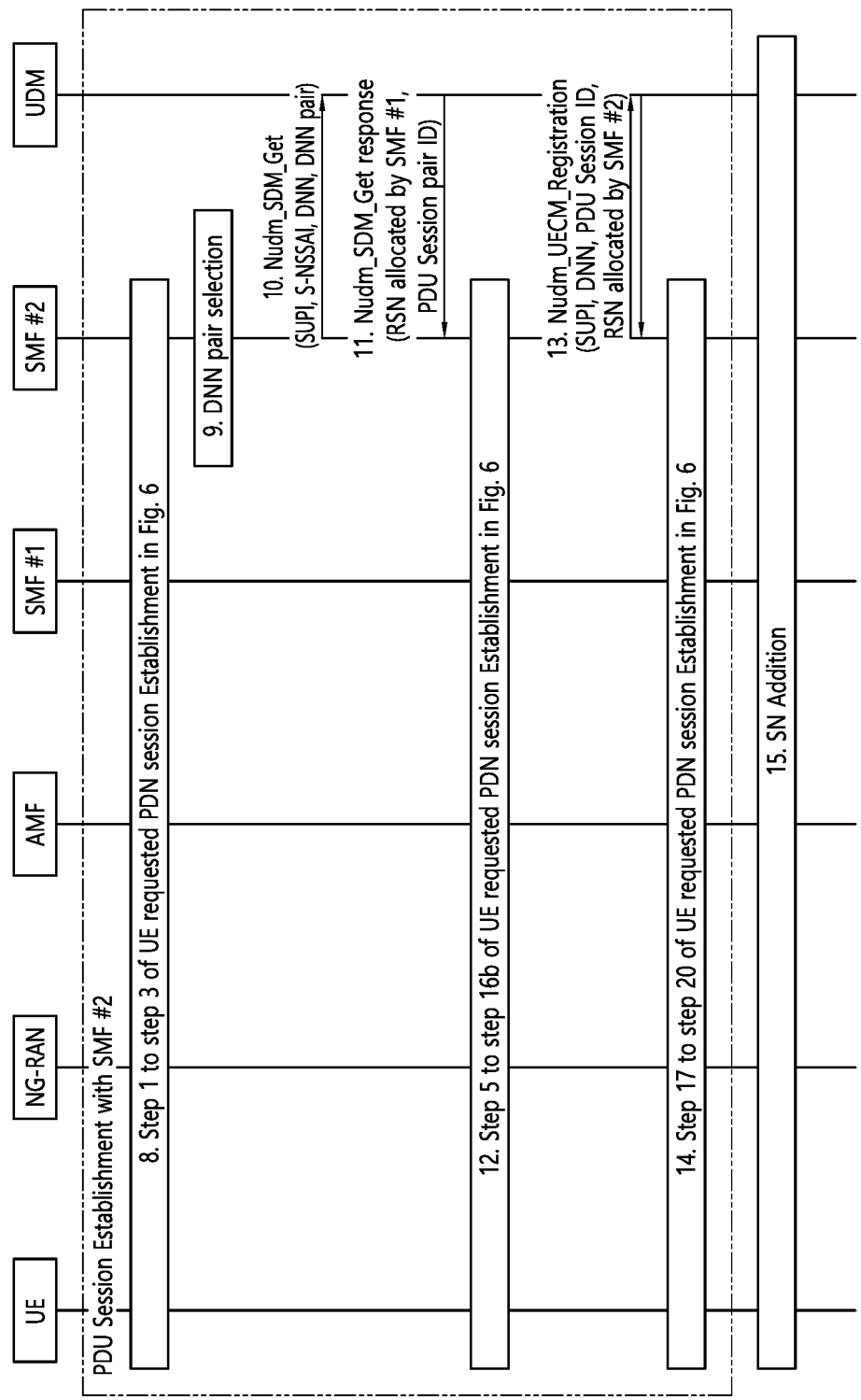

FIGS. 8a and 8b shows a first exemplary solution of the present disclosure.

In order to avoid reuse of same RSN by different SMFs and provide the information for the duplicated PDU sessions, when establishing the first PDU session for redundant transmission, the SMF #1 provides the PDU session ID and the allocated RSN with the DNN to UDM. Then, when establishing the second PDU session, SMF #2 retrieves from the UDM the value of the RSN allocated by SMF #1 and the corresponding PDU session ID using the associated DNN. Therefore, the SMF #2 can determine different RSN for disjoint paths and also indicate to the NG-RAN the information for the duplicated PDU sessions (i.e., PDU session pair ID).

As shown in FIGS. 8a and 8b, the information for the duplicated PDU sessions is provided.

Step 1) For the first PDU session establishment, steps 1-3 of FIG. 6a are performed. the AMF selects the SMF #1 based on the information (e.g., combination of DNN and S-NSSAI) from the UE.

Step 2) The mapping information between the DNN received from the UE and the associated DNN pair for redundant transmission is locally configured in each SMF. The DNN pair indicates to other nodes (e.g., SMF, UDM, AMF) which DNN is related to the one from the UE for the redundant transmission. Based on this information, the SMF #1 selects the DNN pair.

Step 3) SMF #1 tries to retrieve the Session Management Subscription data using Nudm_SDM_Get (SUPI, Session Management Subscription data, DNN, S-NSSAI, DNN pair) and subscribes to be notified when this subscription data is modified using Nudm_SDM_Subscribe (SUPI, Session Management Subscription data, DNN, S-NSSAI, DNN pair).

Step 4) On receiving the message from the SMF #1, UDM may get this information from UDR by Nudr_DM_Query (SUPI, Subscription Data, Session Management Subscription data, DNN, S-NSSAI, DNN pair) and may subscribe to notifications from UDR for the same data by Nudr_DM_subscribe. Then, the UDM checks whether the RSN related to the DNN pair received from the SMF #1 is stored or not. In this case, since there is no RSN information for the DNN pair, the UDM responses with only the Session Management Subscription data to SMF #1.

Then, the SMF #1 selects the RSN for this PDU session.

Step 5) Step 5 to step 16b of the UE requested PDU Session Establishment procedure in FIG. 6 are performed. During this step, the RSN selected by the SMF #1 is sent to the NG-RAN. The PDU session ID for the paired PDU session can be provided to the NG-RAN together with the RSN for this PDU session.

Step 6) If Request Type indicates neither "Emergency Request" nor "Existing Emergency PDU Session" and, if the SMF #1 has not yet registered for this PDU Session, then the SMF #1 registers with the UDM using Nudm_UECM_Registration (SUPI, DNN, PDU Session ID, SMF Identity, RSN allocated by SMF #1) for a given PDU Session. As a result, the UDM stores following information: SUPI, SMF identity and the associated DNN, PDU Session ID, and the RSN allocated by the SMF #1. The UDM may further store this information in UDR by Nudr_DM_Update (SUPI, Subscription Data, UE context in SMF data).

Step 7) Step 17 to step 20 of the UE requested PDU Session Establishment procedure in FIG. 6 are performed.

Step 8) For second PDU session establishment, steps 1-3 of FIG. 6 are performed. the AMF selects the SMF #2 based on the information (e.g., combination of DNN and S-NSSAI) from the UE.

Step 9) The mapping information between the DNN received from the UE and the DNN pair for redundant transmission is locally configured in each SMF. The DNN pair indicates to other nodes (e.g., SMF, UDM, AMF) which DNN is related to the one from the UE for the redundant transmission. Based on this information, the SMF #2 selects the DNN pair.

Step 10) SMF #2 tries to retrieve the Session Management Subscription data using Nudm_SDM_Get (SUPI, Session Management Subscription data, DNN, S-NSSAI, DNN pair) and subscribes to be notified when this subscription data is modified using Nudm_SDM_Subscribe (SUPI, Session Management Subscription data, DNN, S-NSSAI, DNN pair).

Step 11) On receiving the message from the SMF #2, UDM may get this information from UDR by Nudr_DM_Query (SUPI, Subscription Data, Session Management Subscription data, DNN, S-NSSAI, DNN pair) and may subscribe to notifications from UDR for the same data by Nudr_DM_subscribe. Then, the UDM checks whether the RSN related to the DNN pair received from the SMF #2 is stored or not. In this case, since RSN information (i.e., RSN allocated by SMF #1) for the DNN pair is already stored, the UDM responses with this stored RSN and the Session Management Subscription data to SMF #2. The PDU session pair ID, which is identical to the PDU session ID indicated by the SMF #1 in step 6, is also sent to the SMF #2.

Based on this information, the SMF #2 selects the RSN other than the one allocated by the SMF #1.

Step 12) Step 5 to step 16b of the UE requested PDU Session Establishment procedure in FIG. 6 are performed. During this step, the RSN selected by the SMF #2 and the PDU session pair ID are sent to the NG-RAN.

Step 13) If Request Type indicates neither "Emergency Request" nor "Existing Emergency PDU Session" and, if the SMF #1 has not yet registered for this PDU Session, then the SMF #2 registers with the UDM using Nudm_UECM_Registration (SUPI, DNN, PDU Session ID, SMF Identity, RSN allocated by SMF #2) for a given PDU Session. As a result, the UDM stores following information: SUPI, SMF identity and the associated DNN, PDU Session ID, and the RSN allocated by the SMF #2. The UDM may further store this information in UDR by Nudr_DM_Update (SUPI, Subscription Data, UE context in SMF data).

Step 14) Step 17 to step 20 of the UE requested PDU Session Establishment procedure in FIG. 6 are performed.

Step 15) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the PDU session pair information.

A secondary node (SN) Addition procedure for dual connectivity (DC) may be initiated after the step 12 of the UE requested PDU Session Establishment procedure in FIG. 6.

By using the first exemplary solution, two SMFs are able to allocate different RSN value to two redundant PDU sessions without direct coordination between two SMFs. The information on which PDU sessions are duplicated for redundant transmission can be also provided to the NG-RAN.

Figure 9A:
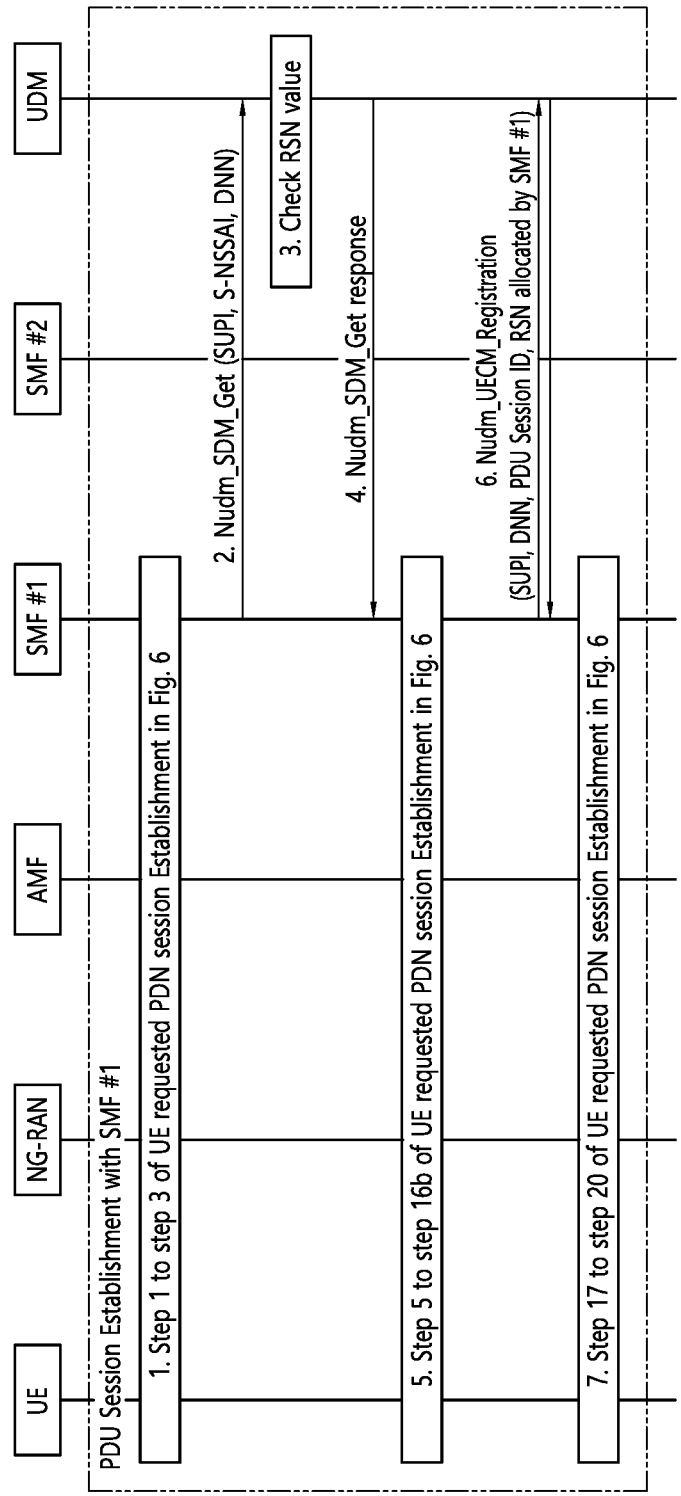
FIGS. 9a and 9b show a second exemplary solution of the present disclosure.
Figure 9B:
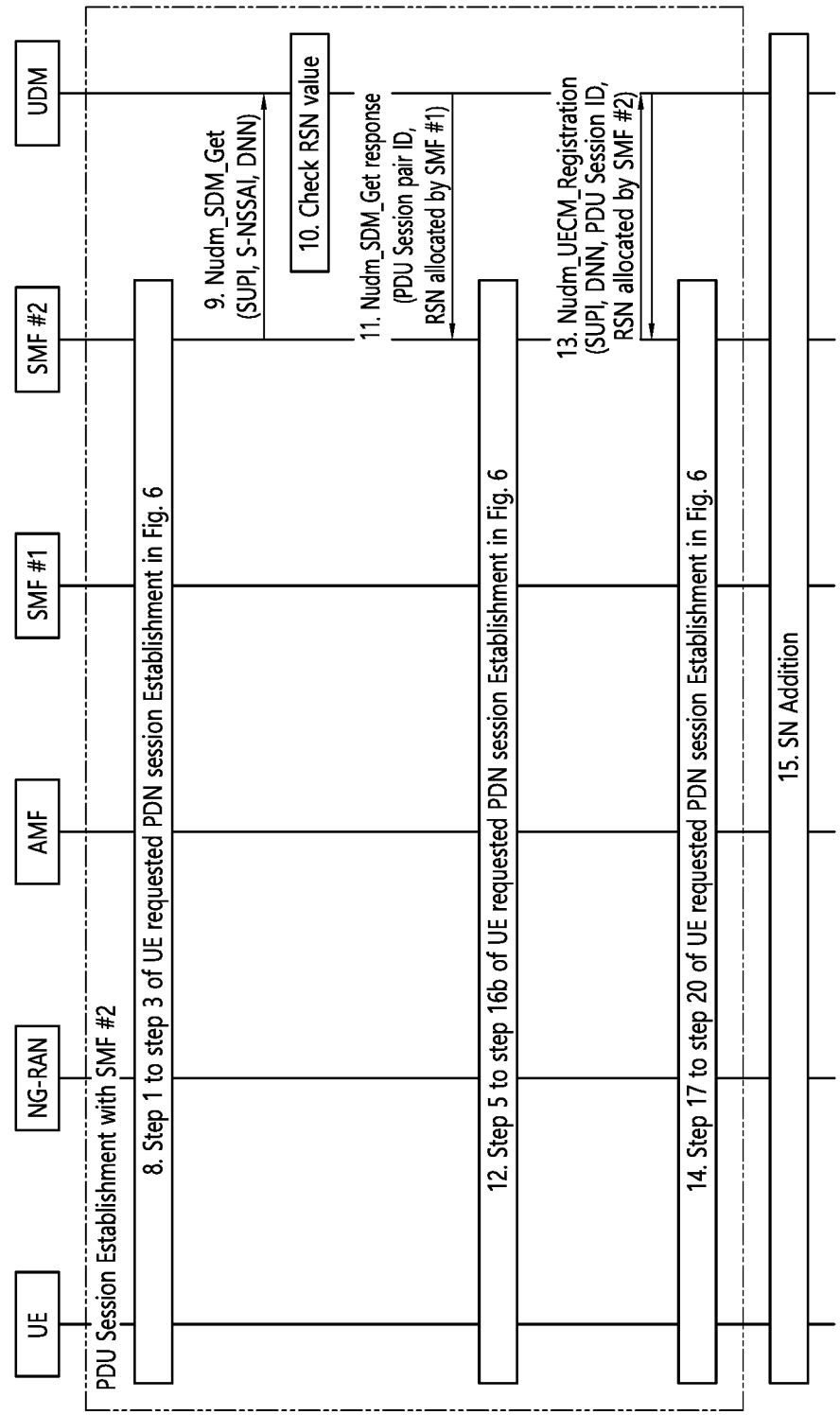

FIGS. 9a and 9b shows a second exemplary solution of the present disclosure.

In order to avoid reuse of same RSN by different SMFs and provide the information for the duplicated PDU sessions, when establishing the first PDU session for redundant transmission, the SMF #1 provides the PDU session ID and the allocated RSN with the DNN to UDM. Then, when establishing the second PDU session, SMF #2 tries to retrieve the Session Management Subscription data using the DNN. When the relation between the DNN and associated DNN for redundancy transmission is locally configured in the UDM, the UDM is able to find the RSN allocated by the SMF #1 and the corresponding PDU session ID in UDR, and provide it to the SMF #2. Therefore, the SMF #2 can determine different RSN for disjoint paths and also indicate to the NG-RAN the information for the duplicated PDU sessions (i.e., PDU session pair ID).

The second exemplary solution is proposed to avoid reuse of same RSN by different SMFs and provide the information for the duplicated PDU sessions. As illustrated in FIGS. 9a and 9b, the proposed procedure has the following steps:

Step 1) For the first PDU session establishment, steps 1-3 of FIG. 6 are performed. the AMF selects the SMF #1 based on the information (e.g., combination of DNN and S-NSSAI) from the UE.

Step 2) SMF #1 tries to retrieve the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI).

Step 3) On receiving the message from the SMF #1, UDM may get this information from UDR by Nudr_DM_Query (SUPI, Subscription Data, Session Management Subscription data, DNN, S-NSSAI) and may subscribe to notifications from UDR for the same data by Nudr_DM_subscribe.

The mapping information between the DNN received from the SMF1 and the DNN pair for redundant transmission is locally configured in UDM. The DNN pair indicates to other nodes (e.g., SMF, UDM, AMF) which DNN is related to the one from the UE for the redundant transmission. Therefore, this information enables the UDM to check whether the RSN related to the DNN pair indicated by the SMF #1 is stored or not.

Step 4) Since there is no RSN information for the DNN pair, the UDM responses with only the Session Management Subscription data to SMF #1.

Then, the SMF #1 selects the RSN for this PDU session.

Step 5) Step 5 to step 16b of the UE requested PDU Session Establishment procedure in FIG. 6 are performed. During this step, the RSN selected by the SMF #1 is sent to the NG-RAN. The PDU session ID for the paired PDU session can be also provided to the NG-RAN together with the RSN for this PDU session.

Step 6) If Request Type indicates neither "Emergency Request" nor "Existing Emergency PDU Session" and, if the SMF #1 has not yet registered for this PDU Session, then the SMF #1 registers with the UDM using Nudm_UECM_Registration (SUPI, DNN, PDU Session ID, SMF Identity, RSN allocated by SMF #1) for a given PDU Session. As a result, the UDM stores following information: SUPI, SMF identity and the associated DNN, PDU Session ID, and the RSN allocated by the SMF #1. The UDM may further store this information in UDR by Nudr_DM_Update (SUPI, Subscription Data, UE context in SMF data).

Step 7) Step 17 to step 20 of the UE requested PDU Session Establishment procedure in FIG. 6 are performed.

Step 8) For second PDU session establishment, steps 1-3 of FIG. 6 are performed. the AMF selects the SMF #2 based on the information (e.g., combination of DNN and S-NSSAI) from the UE.

Step 9) SMF #2 tries to retrieve the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI).

Step 10) On receiving the message from the SMF #2, UDM may get this information from UDR by Nudr_DM_Query (SUPI, Subscription Data, Session Management Subscription data, DNN, S-NSSAI, DNN pair) and may subscribe to notifications from UDR for the same data by Nudr_DM_subscribe.

The mapping information between the DNN received from the SMF #2 and the DNN pair for redundant transmission is locally configured in UDM. The DNN pair indicates to other nodes (e.g., SMF, UDM, AMF) which DNN is related to the one from the UE for the redundant transmission. Therefore, this information enables the UDM to check whether the RSN related to the DNN pair indicated by the SMF #2 is stored or not. In this case, based on the DNN from the SMF #2 and locally configured mapping information, the UDM can find the RSN allocated by the SMF #1 and the corresponding PDU session ID.

Step 11) Then, the UDM responses with the RSN allocated by the SMF #1, its corresponding PDU session ID (i.e, PDU session pair ID), and the Session Management Subscription data to SMF #2.

Based on this information, the SMF #2 selects the RSN other than the one allocated by the SMF #1.

Step 12) Step 5 to step 16b of the UE requested PDU Session Establishment procedure in FIG. 6 are performed. During this step, the RSN selected by the SMF #2 and the PDU session pair ID are sent to the NG-RAN.

Step 13) If Request Type indicates neither "Emergency Request" nor "Existing Emergency PDU Session" and, if the SMF #1 has not yet registered for this PDU Session, then the SMF #2 registers with the UDM using Nudm_UECM_Registration (SUPI, DNN, PDU Session ID, SMF Identity, RSN allocated by SMF #2) for a given PDU Session. As a result, the UDM stores following information: SUPI, SMF identity and the associated DNN, PDU Session ID, and the RSN allocated by the SMF #2. The UDM may further store this information in UDR by Nudr_DM_Update (SUPI, Subscription Data, UE context in SMF data).

Step 14) Step 17 to step 20 of the UE requested PDU Session Establishment procedure in FIG. 6 are performed.

Step 15) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the PDU session pair information.

It is noted that the SN Addition procedure may be initiated after the step 12 of the UE requested PDU Session Establishment procedure in FIG. 6.

By using the second exemplary solution, two SMFs are able to allocate different RSN value to two redundant PDU sessions without direct coordination between two SMFs. From the SMF functionality point of view, there is no significant standardization impact since the UDM checks whether the RSN allocated by the other SMF is stored or not based on local configuration and the DNN from SMF. The information on which PDU sessions are duplicated for redundant transmission can be also provided to the NG-RAN.

Figure 10:
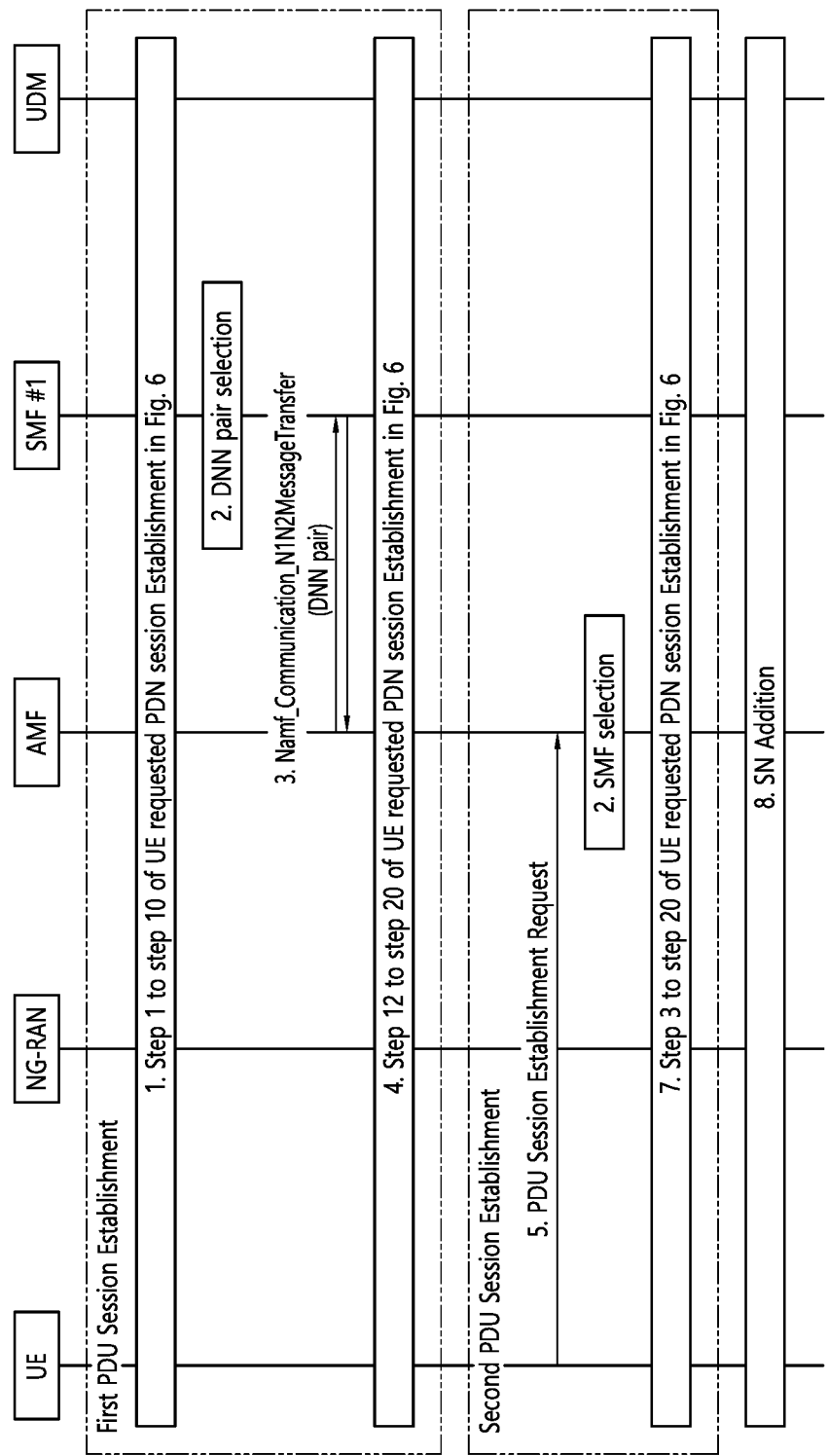
FIG. 10 shows a third exemplary solution of the present disclosure.

FIG. 10 shows a third exemplary solution of the present disclosure.

In order to avoid reuse of same RSN by different SMFs and provide the information for the duplicated PDU sessions, when establishing the first PDU session for redundant transmission, the SMF #1 provides to the AMF the associated DNN pair to indicate that this DNN related PDU session for the UE should be routed to SMF #1 for redundant transmission. Then, when establishing the second PDU session, the AMF selects SMF #1 instead of SMF #2. Therefore, the SMF #1 can determine different RSN for disjoint paths and also indicate to the NG-RAN the information for the duplicated PDU sessions (i.e., PDU session pair ID).

The third exemplary solution is proposed to avoid reuse of same RSN by different SMFs and provide the information for the duplicated PDU sessions. As illustrated in FIG. 10, the proposed procedure has the following steps:

Step 1) For the first PDU session establishment, steps 1-10 of FIG. 6 are performed. the AMF selects the SMF #1 based on the information (e.g., combination of DNN and S-NSSAI) from the UE.

Step 2) The mapping information between the DNN received from the UE and the DNN pair for redundant transmission is locally configured in each SMF. The DNN pair indicates to other nodes (e.g., SMF, UDM, AMF) which DNN is related to the one from the UE for the redundant transmission. Based on this information, the SMF #1 selects the DNN pair.

Step 3) The DNN pair can be used to indicate to the AMF that this DNN related PDU session for the UE should be routed to SMF #1 for redundant transmission. The SMF #1 sends the Namf_Communication_N1N2MessageTransfer containing the DNN pair. On receiving the message from the SMF #1, the AMF should store this information in order to forward the redundant PDU session establishment request to the SMF #1.

Step 4) Step 12 to step 20 of the UE requested PDU Session Establishment procedure in FIG. 6 are performed. During this step, the RSN selected by the SMF #1 is sent to the NG-RAN. The PDU session ID for the paired PDU session can be also provided to the NG-RAN together with the RSN for this PDU session.

Step 5) For second PDU session establishment, the UE sends the PDU Session Establishment Request message containing the combination of DNN and S-NSSAI to the AMF.

Step 6) the AMF selects the SMF #1 in case the UE provided DNN is matched with the DNN pair stored in step 3.

Step 7) Step 3 to step 20 of the UE requested PDU Session Establishment procedure in FIG. 6 are performed. Since both PDU sessions for redundant transmission are handled by SMF #1, the value of RSN to each PDU session can be allocated disjointly. During this step, the RSN selected by the SMF #2 and the PDU session pair ID are sent to the NG-RAN.

Step 8) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the PDU session pair information.

It is noted that the SN Addition procedure may be initiated after the step 12 of the UE requested PDU Session Establishment procedure in FIG. 6.

By using the third exemplary solution, one SMF is always selected to support the redundant transmission for the UE. Therefore, there is no problem to reuse of same RSN by different SMFs. The information on which PDU sessions are duplicated for redundant transmission can be also provided to the NG-RAN.

Figure 11A:
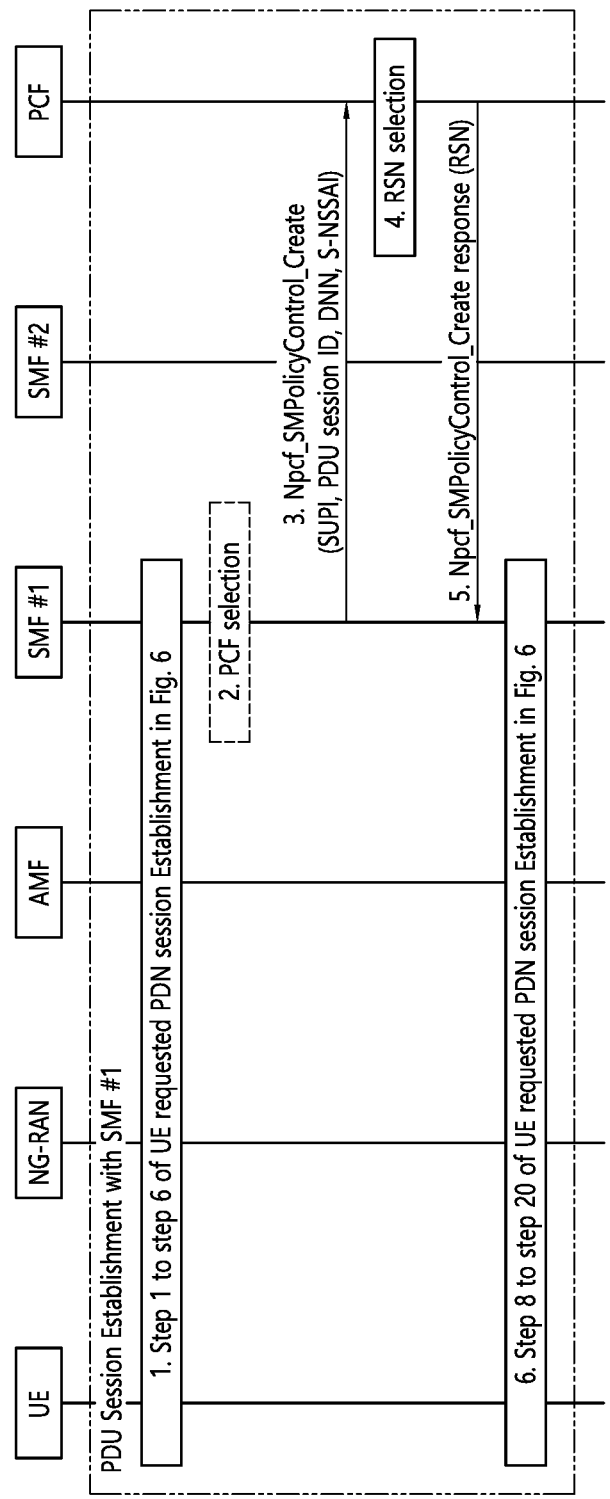
FIGS. 11a and 11b show a fourth exemplary solution of the present disclosure.
Figure 11B:
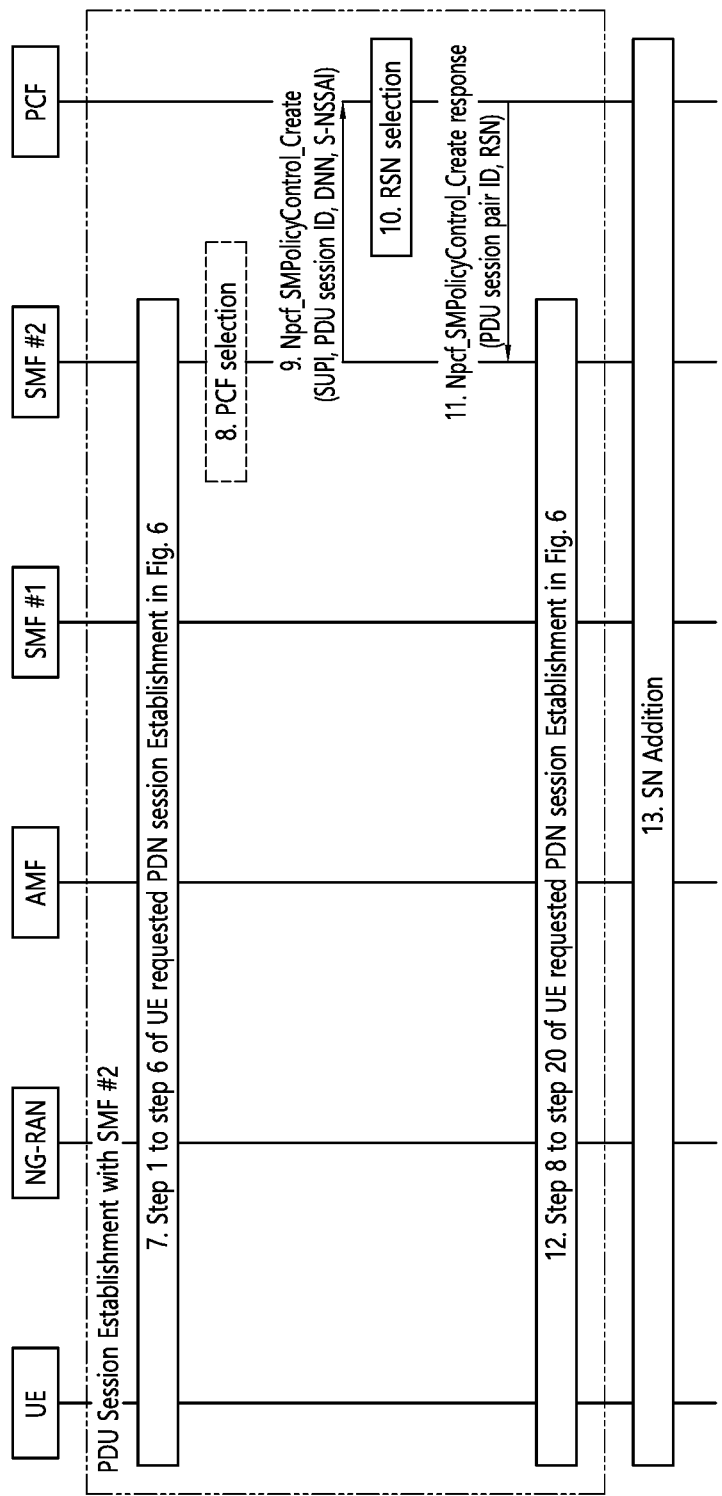

FIGS. 11a and 11b shows a fourth exemplary solution of the present disclosure.

In order to avoid reuse of same RSN by different SMFs and provide the information for the duplicated PDU sessions, when establishing the first PDU session for redundant transmission, the SMF #1 requests the RSN allocation to PCF. Based on the DNN only or combination of S-NSSAI and DNN, the PCF selects the RSN for first PDU session and sends it to the SMF #1. Also, the PCF stores the RSN and corresponding PDU session ID. Then, when establishing the second PDU session, SMF #2 requests the RSN allocation to PCF. The PCF selects the RSN other than the one allocated for the SMF #1, and then sends to the SMF #2 the RSN along with the PDU session pair ID which is identical to the first PDU session ID. Therefore, the SMF #2 can indicate to the NG-RAN the different RSN for disjoint paths and the information for the duplicated PDU sessions (i.e., PDU session pair ID).

The fourth exemplary solution is proposed to avoid reuse of same RSN by different SMFs and provide the information for the duplicated PDU sessions. As illustrated in FIGS. 11a and 11b, the proposed procedure has the following steps:

Step 1) For the first PDU session establishment, steps 1-6 of FIG. 6 are performed.

Step 2) Based on the DNN only or combination of S-NSSAI and DNN, the SMF #1 performs PCF selection.

Step 3) By invoking Npcf_SMPolicyControl_Create operation, the SMF #1 performs an SM Policy Association Establishment procedure to establish an SM Policy Association with the PCF and get the default PCC Rules and the RSN for the PDU Session. At least, the SMF #1 includes the following information: SUPI, PDU Session ID, S-NSSAI, and DNN.

Step 4) The PCF makes the authorization and the policy decision. Based on the DNN only or combination of S-NSSAI and DNN, the PCF also selects the RSN for this PDU session.

It is noted that the mapping between the RSN and DNN, or the mapping between the RSN and combination of S-NSSAI and DNN is locally configured in PCF.

Step 5) The PCF answers with a Npcf_SMPolicy Control_Create response; in its response the PCF may provide policy information and the RSN. The PCF stores the RSN selected for the first PDU session and its corresponding PDU session ID.

Step 6) Step 8 to step 20 of the UE requested PDU Session Establishment procedure in FIG. 6 are performed. The PDU session ID for the paired PDU session can be provided to the NG-RAN together with the RSN for this PDU session.

Step 7) For second PDU session establishment, steps 1-6 of FIG. 6 are performed.

Step 8) Based on the DNN only or combination of S-NSSAI and DNN, the SMF #2 performs PCF selection. In this case, the DNN or combination of S-NSSAI and DNN is already configured to select same PCF with the first PDU session in step 2.

Step 9) By invoking Npcf_SMPolicyControl_Create operation, the SMF #2 performs an SM Policy Association Establishment procedure to establish an SM Policy Association with the PCF and get the default PCC Rules and the RSN for the PDU Session. At least, the SMF #2 includes the following information: SUPI, PDU Session ID, S-NSSAI, and DNN.

Step 10) The PCF makes the authorization and the policy decision. Based on the DNN only or combination of S-NSSAI and DNN, the PCF also selects the RSN for the second PDU session.

It is noted that the mapping information between the RSN and DNN, or the mapping information between the RSN and combination of S-NSSAI and DNN is locally configured in PCF.

Step 11) The PCF answers with a Npcf_SMPolicyControl_Create response; in its response the PCF may provide policy information and the RSN along with the PDU session pair ID which is identical to the first PDU session ID. The PCF also stores the RSN selected for the second PDU session and its corresponding PDU session ID. The SMF #1 may be also informed of the RSN selected for the second PDU session and its corresponding PDU session ID.

Step 12) Step 8 to step 20 of the UE requested PDU Session Establishment procedure in FIG. 6 are performed. The PDU session ID for the paired PDU session can be provided to the NG-RAN together with the RSN for this PDU session.

Step 13) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the PDU session pair information.

It is noted that the SN Addition procedure may be initiated after the step 12 of the UE requested PDU Session Establishment procedure in FIG. 6.

By using the fourth exemplary solution, two SMFs are able to use different RSN value to two redundant PDU sessions without direct coordination between two SMFs. From the SMF functionality point of view, there is no significant standardization impact since the PCF selects different RSN value for each PDU session based on local configuration and the DNN from SMF. The information on which PDU sessions are duplicated for redundant transmission can be also provided to the NG-RAN.

Figure 12:
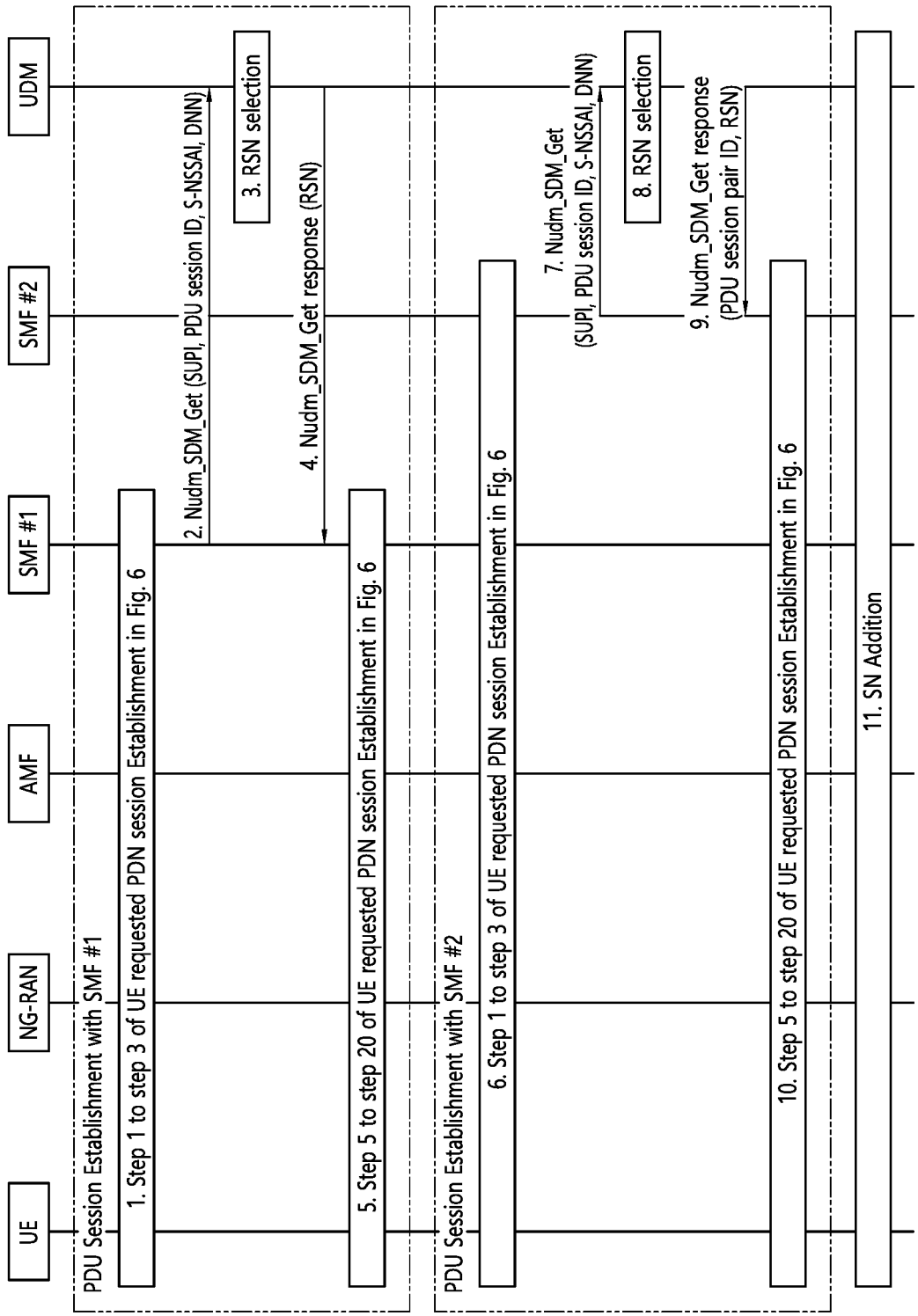
FIG. 12 shows a fifth exemplary solution of the present disclosure

FIG. 12 shows a fifth exemplary solution of the present disclosure

In order to avoid reuse of same RSN by different SMFs and provide the information for the duplicated PDU sessions, when establishing the first PDU session for redundant transmission, the SMF #1 requests the RSN allocation to UDM. Based on the DNN only or combination of S-NSSAI and DNN, the UDM selects the RSN for first PDU session and sends it to the SMF #1. Also, the UDM stores the RSN and corresponding PDU session ID. Then, when establishing the second PDU session, SMF #2 requests the RSN allocation to UDM. The UDM selects the RSN other than the one allocated for the SMF #1, and then sends to the SMF #2 the RSN along with the PDU session pair ID which is identical to the first PDU session ID. Therefore, the SMF #2 can indicate to the NG-RAN the different RSN for disjoint paths and the information for the duplicated PDU sessions (i.e., PDU session pair ID).

The fifth exemplary solution is proposed to avoid reuse of same RSN by different SMFs and provide the information for the duplicated PDU sessions. As illustrated in FIG. 12, the proposed procedure has the following steps:

Step 1) For the first PDU session establishment, steps 1-3 of FIG. 6 are performed. the AMF selects the SMF #1 based on the information (e.g., combination of DNN and S-NSSAI) from the UE.

Step 2) SMF #1 tries to retrieve the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI). In addition, the SMF #1 requests the RSN allocation for this PDU session to the UDM.

Step 3) On receiving the message from the SMF #1, the UDM may get the Session Management Subscription data from UDR by Nudr_DM_Query (SUPI, Subscription Data, Session Management Subscription data, DNN, S-NSSAI) and may subscribe to notifications from UDR for the same data by Nudr_DM_subscribe.

The mapping information between the RSN and DNN, or the mapping information between the RSN and combination of S-NSSAI and DNN is locally configured in UDM. This information enables the UDM to select the RSN for this PDU session.

Step 4) The UDM responses with only the Session Management Subscription data and the RSN for this PDU session to SMF #1. The UDM also stores the RSN selected for the first PDU session and its corresponding PDU session ID.

Step 5) Step 5 to step 20 of the UE requested PDU Session Establishment procedure in FIG. 6 are performed. The PDU session ID for the paired PDU session can be provided to the NG-RAN together with the RSN for this PDU session.

Step 6) For second PDU session establishment, steps 1-3 of FIG. 6 are performed. the AMF selects the SMF #2 based on the information (e.g., combination of DNN and S-NSSAI) from the UE.

Step 7) The SMF #2 tries to retrieve the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI). In addition, the SMF #2 requests the RSN allocation for this PDU session to the UDM.

Step 8) On receiving the message from the SMF #2, UDM may get this information from UDR by Nudr_DM_Query (SUPI, Subscription Data, Session Management Subscription data, DNN, S-NSSAI) and may subscribe to notifications from UDR for the same data by Nudr_DM_subscribe.

The mapping information between the RSN and DNN, or the mapping information between the RSN and combination of S-NSSAI and DNN is locally configured in UDM. Also, in step 4, the RSN selected for the first PDU session and its corresponding PDU session ID are already stored in UDM. Therefore, this information enables the UDM to select the RSN other than the one allocated for the first PDU session.

Step 9) Then, the UDM responses with the RSN for the second PDU session, the PDU session pair ID which is identical to the first PDU session ID, and the Session Management Subscription data to SMF #2. The SMF #1 may be also informed of the RSN selected for the second PDU session and its corresponding PDU session ID.

Step 10) Step 5 to step 20 of the UE requested PDU Session Establishment procedure in FIG. 6 are performed. The PDU session ID for the paired PDU session can be provided to the NG-RAN together with the RSN for this PDU session.

Step 11) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the PDU session pair information.

It is noted that the SN Addition procedure may be initiated after the step 12 of the UE requested PDU Session Establishment procedure in FIG. 6.

By using the fifth exemplary solution, two SMFs are able to use different RSN value to two redundant PDU sessions without direct coordination between two SMFs. From the SMF functionality point of view, there is no significant standardization impact since the UDM selects different RSN value for each PDU session based on local configuration and the DNN from SMF. The information on which PDU sessions are duplicated for redundant transmission can be also provided to the NG-RAN.

Figure 13A:
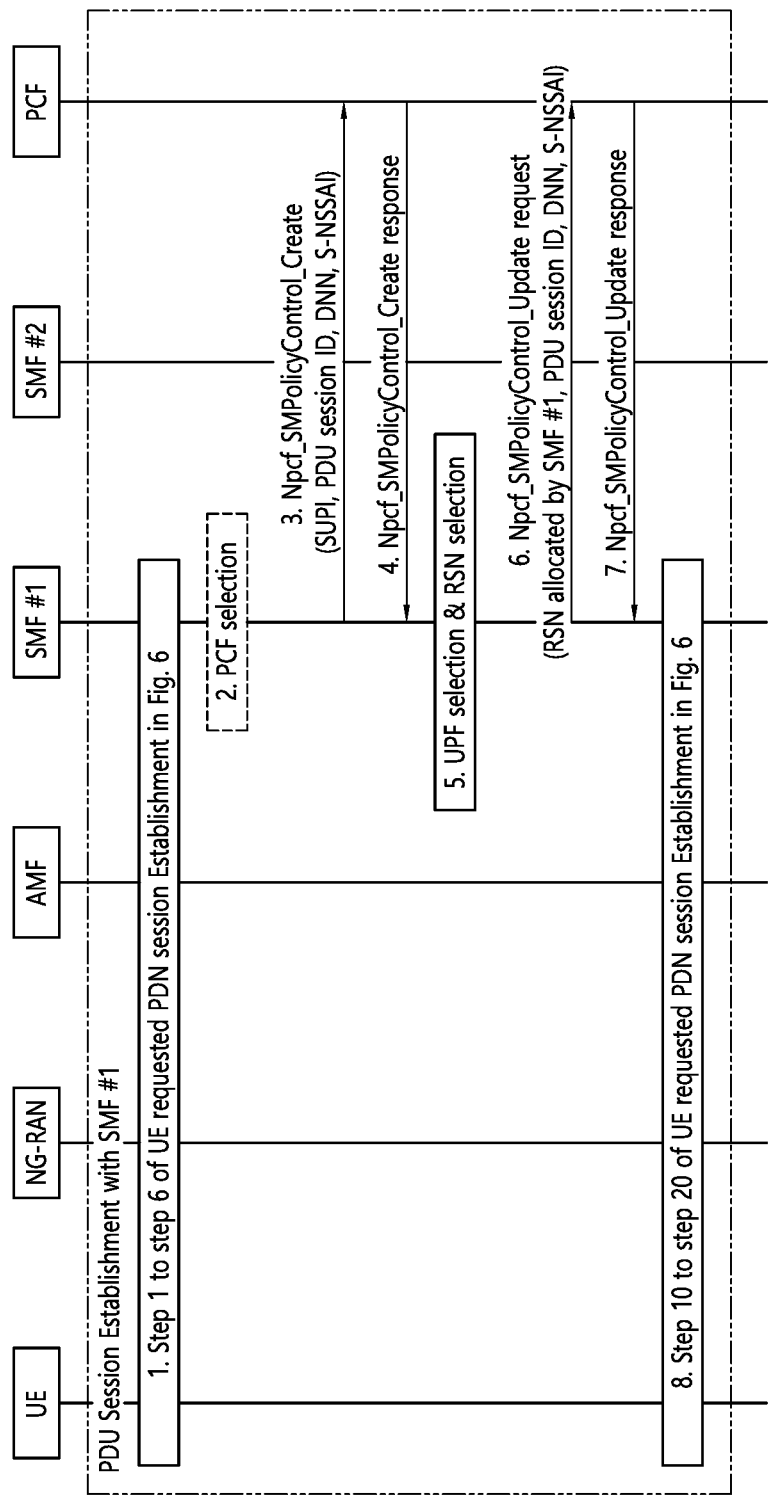
FIGS. 13a and 13b show a sixth exemplary solution of the present disclosure.
Figure 13B:
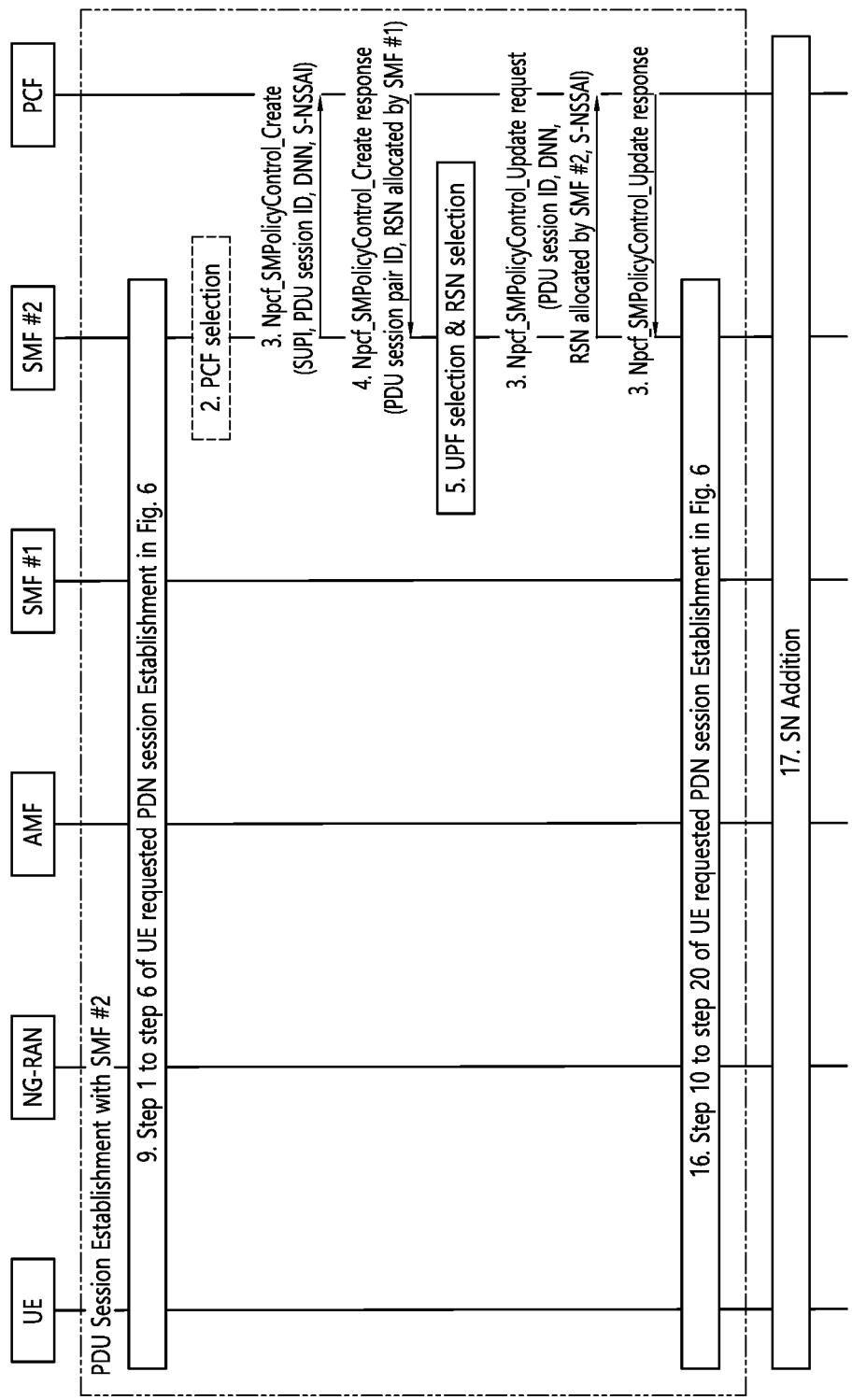

FIGS. 13a and 13b shows a sixth exemplary solution of the present disclosure.

In order to avoid reuse of same RSN by different SMFs and provide the information for the duplicated PDU sessions, when establishing the first PDU session for redundant transmission, the PCF provides the RSN and the PDU session ID used for other PDU Session paired with this PDU Session if available. Based on this information, the SMF #1 is able to select the distinct RSN value and determine the PDU session pair information (i.e., the PDU session ID for paired PDU session). Then, the SMF #1 stores the RSN for this PDU session and the PDU session ID to the context for the DNN paired with this DNN. Therefore, when establishing the second PDU session, SMF #2 can retrieve this information from the PCF. In addition, the SMF #2 can select the different RSN for disjoint paths and the information for the duplicated PDU sessions (i.e., PDU session pair ID).

The sixth exemplary solution is proposed to avoid reuse of same RSN by different SMFs and provide the information for the duplicated PDU sessions. As illustrated in FIGS. 13a and 13b, the proposed procedure has the following steps:

Step 1) For the first PDU session establishment, steps 1-6 of FIG. 6 are performed. the AMF selects the SMF #1 based on the information (e.g., combination of DNN and S-NSSAI) from the UE.

Step 2) Based on the DNN only or combination of S-NSSAI and DNN, the SMF #1 performs PCF selection.

Step 3) By invoking Npcf_SMPolicyControl_Create operation, the SMF #1 performs an SM Policy Association Establishment procedure to establish an SM Policy Association with the PCF and get the default PCC Rules. At least, the SMF #1 includes the following information: SUPI, PDU Session ID, S-NSSAI, and DNN. If available, the SMF #1 also provides the RSN for this PDU session.

Step 4) The PCF makes the authorization and the policy decision. The PCF checks whether the DNN for this PDU Session is for redundant transmission. If the DNN provided by the SMF #1 is configured for redundant transmission, and there are the RSN and PDU Session pair information (i.e., PDU session ID for paired PDU session) for this DNN, the PCF provides this information to the SMF. If available, the RSN provided in step 3 may be also used to find the context for the DNN paired with this DNN.

The PCF stores the PDU Session ID as the PDU session pair information to the context for the DNN paired with this DNN, i.e. the DNN used for other PDU Session paired with this PDU Session for redundant transmission. If the RSN is provided in step 3, the PCF also stores the RSN to the context for the DNN paired with this DNN. In this case, the SMF #1 does not provide the RSN value to the PCF in step 6.

Step 5) The SMF #1 also selects one or more UPFs as needed. If the RSN selection is not performed in step 4 of FIG. 6, the SMF #1 selects the RSN based on the information from the PCF. Even if the RSN is selected in step 4 of FIG. 6, when the selected RSN is the same with the RSN for the paired PDU session, the SMF #1 may reselect the RSN value for this PDU session.

Step 6) The SMF #1 may perform an SMF initiated SM Policy Association Modification procedure to provide information on the Policy Control Request Trigger condition(s) that have been met or to store the allocated RSN and the PDU session ID. If Request Type is "initial request" and dynamic PCC is deployed and PDU Session Type is IPv4 or IPv6 or IPv4v6, SMF notifies the PCF (if the Policy Control Request Trigger condition is met) with the allocated UE IP address/prefix(es). If the DNN is configured for redundant transmission and the RSN selection is not stored in step 4, the PCF stores the RSN to the context for the DNN paired with this DNN, i.e. the DNN used for other PDU Session paired with this PDU Session for redundant transmission. The PDU session ID may be stored to the context for the DNN paired with this DNN in this step instead of step 4.

Step 7) PCF may provide updated policies to the SMF. The PCF may provide policy information to SMF.

Step 8) Step 10 to step 20 of the UE requested PDU Session Establishment procedure in FIG. 6 are performed. The PDU session ID for the paired PDU session can be provided to the NG-RAN together with the RSN for this PDU session.

Step 9) For second PDU session establishment, steps 1-6 of FIG. 6 are performed. the AMF selects the SMF #2 based on the information (e.g., combination of DNN and S-NSSAI) from the UE.

Step 10) Based on the DNN only or combination of S-NSSAI and DNN, the SMF #2 performs PCF selection. In this case, the DNN or combination of S-NSSAI and DNN is already configured to select same PCF with the first PDU session in step 2.

Step 11) By invoking Npcf_SMPolicyControl_Create operation, the SMF #2 performs an SM Policy Association Establishment procedure to establish an SM Policy Association with the PCF and get the default PCC Rules. At least, the SMF #2 includes the following information: SUPI, PDU Session ID, S-NSSAI, and DNN. If available, the SMF #2 also provides the RSN for this PDU session.

Step 12) The PCF makes the authorization and the policy decision. The PCF checks whether the DNN for this PDU Session is for redundant transmission. If the DNN provided by the SMF #2 is configured for redundant transmission, and there are the RSN and PDU Session pair information (i.e., PDU session ID for paired PDU session) for this DNN, the PCF provides this information to the SMF. If available, the RSN provided in step 9 may be also used to find the context for the DNN paired with this DNN.

The PCF stores the PDU Session ID as the PDU session pair information to the context for the DNN paired with this DNN, i.e. the DNN used for other PDU Session paired with this PDU Session for redundant transmission. If the RSN is provided in step 9, the PCF also stores the RSN to the context for the DNN paired with this DNN. In this case, the SMF #2 does not provide the RSN value to the PCF in step 14.

Step 13) The SMF #2 also selects one or more UPFs as needed. If the RSN selection is not performed in step 4 of FIG. 6, the SMF #2 selects the RSN based on the information from the PCF. Even if the RSN is selected in step 4 of FIG. 6, when the selected RSN is the same with the RSN for the paired PDU session, the SMF #2 may reselect the RSN value for this PDU session.

Step 14) The SMF #2 may perform an SMF initiated SM Policy Association Modification procedure to provide information on the Policy Control Request Trigger condition(s) that have been met or to store the allocated RSN and the PDU session ID. If Request Type is "initial request" and dynamic PCC is deployed and PDU Session Type is IPv4 or IPv6 or IPv4v6, SMF notifies the PCF (if the Policy Control Request Trigger condition is met) with the allocated UE IP address/prefix(es). If the DNN is configured for redundant transmission and the RSN selection is not stored in step 12, the PCF stores the RSN to the context for the DNN paired with this DNN, i.e. the DNN used for other PDU Session paired with this PDU Session for redundant transmission. The PDU session ID may be stored to the context for the DNN paired with this DNN in this step instead of step 12.

Step 15) PCF may provide updated policies to the SME The PCF may provide policy information to SMF.

Step 16) Step 10 to step 20 of the UE requested PDU Session Establishment procedure in FIG. 6 are performed. The PDU session ID for the paired PDU session can be provided to the NG-RAN together with the RSN for this PDU session.

Step 17) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the PDU session pair information.

It is noted that the SN Addition procedure may be initiated after the step 12 of the UE requested PDU Session Establishment procedure in FIG. 6.

By using the sixth exemplary solution, two SMFs are able to use different RSN value to two redundant PDU sessions without direct coordination between two SMFs. From the SMF functionality point of view, there is no significant standardization impact. The PCF just stores the RSN and PDU session ID to the context for the DNN paired with each DNN, and then provides this information to the other SMF to select the distinct RSN value and determine the PDU session pair information. The information on which PDU sessions are duplicated for redundant transmission can be also provided to the NG-RAN.

In this solution, the mapping information between the RPID and DNN, or the mapping information between the RPID and combination of S-NSSAI, DNN is locally configured in UDM. The RPID (Redundancy Pair ID) enables the NG-RAN to identify the pair of PDU Sessions that are handled redundantly, such that the paired PDU session has the same RPID value. Based on this information, when establishing the PDU session for redundant transmission, the UDM selects the RPID for this PDU session, and then provides it to the SMF. Therefore, the SMF can indicate to the NG-RAN the RSN and the RPID.

Figure 14:
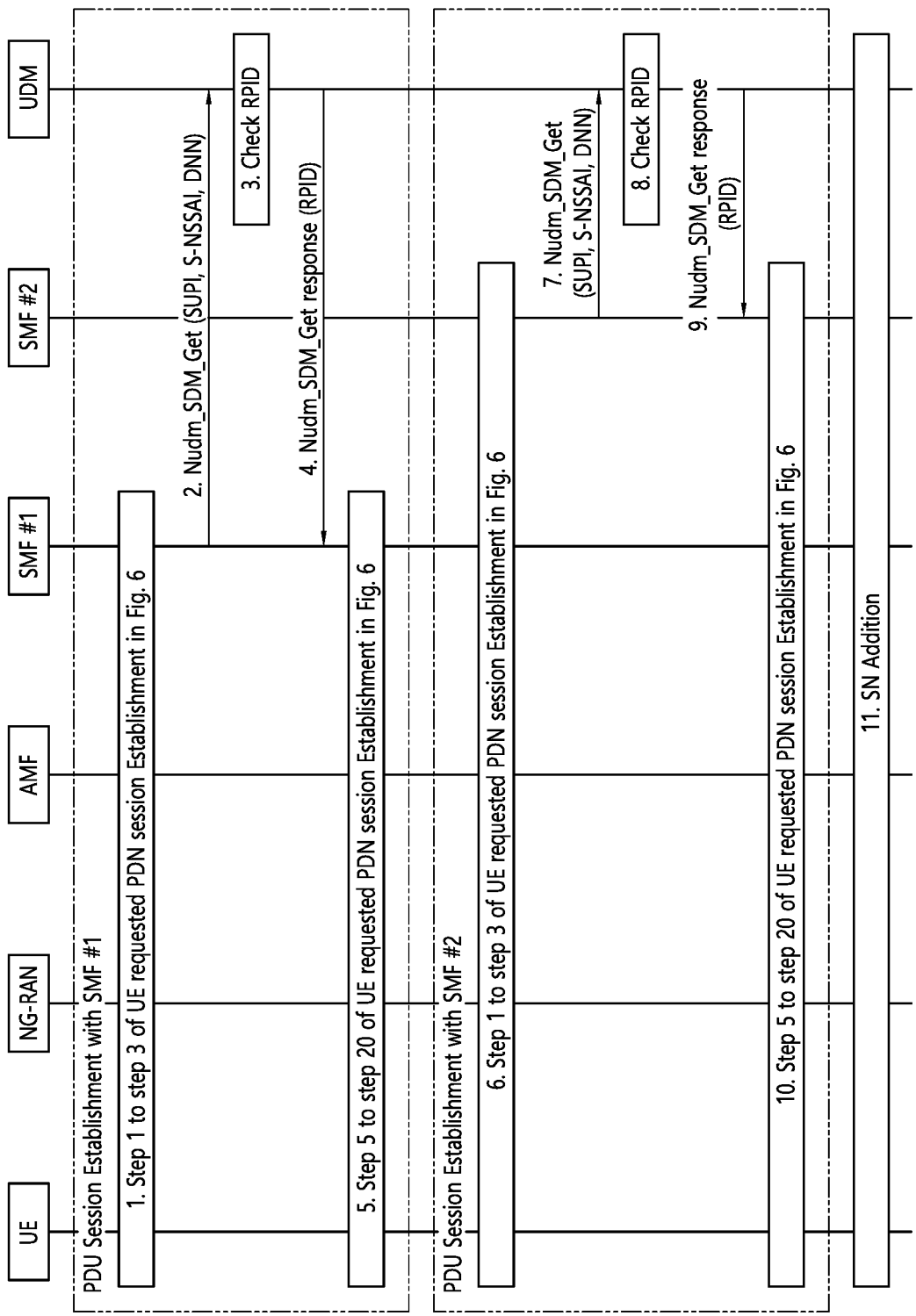
FIG. 14 shows a seventh exemplary solution of the present disclosure

FIG. 14 shows a seventh exemplary solution of the present disclosure

The seventh exemplary solution is proposed to avoid reuse of same RSN by different SMFs and provide the information for the duplicated PDU sessions. As illustrated in FIG. 14, the proposed procedure has the following steps:

Step 1) For the first PDU session establishment, steps 1-3 of FIG. 6 are performed. the AMF selects the SMF #1 based on the information (e.g., combination of DNN and S-NSSAI) from the UE.

Step 2) SMF #1 tries to retrieve the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI).

Step 3) On receiving the message from the SMF #1, UDM may get this information from UDR by Nudr_DM_Query (SUPI, Subscription Data, Session Management Subscription data, DNN, S-NSSAI) and may subscribe to notifications from UDR for the same data by Nudr_DM_subscribe.

The UDM selects the RPID (Redundancy Pair ID) value based on the combination of the S-NSSAI, DNN and local UDM configuration. The RPID enables the NG-RAN to identify the pair of PDU Sessions that are handled redundantly, such that the paired PDU session has the same RPID value.

It is noted that the mapping information between the RPID and DNN, or the mapping information between the RPID and combination of S-NSSAI, DNN is locally configured in UDM.

Step 4) The UDM responses with the Session Management Subscription data and RPID for that PDU session to SMF #1.

Step 5) Step 5 to step 20 of the UE requested PDU Session Establishment procedure in FIG. 6 are performed. During this step, the RSN selected by the SMF #1 is sent to the NG-RAN. The RPID can be also provided to the NG-RAN together with the RSN for this PDU session.

Step 6) For second PDU session establishment, steps 1-3 of FIG. 6 are performed. the AMF selects the SMF #2 based on the information (e.g., combination of DNN and S-NSSAI) from the UE.

Step 7) SMF #2 tries to retrieve the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI).

Step 8) On receiving the message from the SMF #2, UDM may get this information from UDR by Nudr_DM_Query (SUPI, Subscription Data, Session Management Subscription data, DNN, S-NSSAI) and may subscribe to notifications from UDR for the same data by Nudr_DM_subscribe.

The UDM selects the RPID (Redundancy Pair ID) value based on the combination of the S-NSSAI, DNN and local UDM configuration. The RPID enables the NG-RAN to identify the pair of PDU Sessions that are handled redundantly, such that the paired PDU session has the same RPID value.

It is noted that the mapping information between the RPID and DNN, or the mapping information between the RPID and combination of S-NSSAI, DNN is locally configured in UDM.

Step 9) The UDM responses with the Session Management Subscription data and RPID for that PDU session to SMF #2.

Step 10) Step 5 to step 20 of the UE requested PDU Session Establishment procedure in FIG. 6 are performed. During this step, the RSN selected by the SMF #2 is sent to the NG-RAN. The RPID can be also provided to the NG-RAN together with the RSN for this PDU session.

Step 11) Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. Even if the PDU session cannot be set up at the requested RSN, the NG-RAN can provide the disjoint user plane resources for two redundant PDU sessions based on the RPID.

It is noted that the SN Addition procedure may be initiated after the step 12 of the UE requested PDU Session Establishment procedure in FIG. 6.

By using the seventh exemplary solution, the UDM easily determines the RPID to provide the information on which PDU sessions are duplicated for redundant transmission. Also, even if two SMFs allocate the same RSN value to two redundant PDU sessions, the NG-RAN can select different, redundant UP resources based on the RPID value.

It is noted that based on the same RSN value and different PDU session ID for redundant transmission, the NG-RAN may be able to set up redundant user plane resources by means of dual connectivity. The proposed solutions can be applied to this case as well.

<Summary of Disclosures of the Present Disclosure>

The present disclosure provides a method for supporting redundant protocol data unit (PDU) sessions. The method may be performed by a unified data management (UDM) node and comprise: receiving, from a first session management function (SMF) node, a first message including a first redundancy sequence number (RSN) which is allocated by the first SMF node for managing a first PDU session and an identifier of the first PDU session; transmitting, to a second SMF node for managing a second PDU session, a second message including the first RSN and a PDU session pair ID, which is identical to the identifier of the first PDU session; and receiving, from the second SMF node, a third message including a second RSN which is allocated by the second SMF node and an identifier of the second PDU session. The second PDU session may be duplication of the first PDU session.

The first message may further comprise a first data network name (DNN) and an associated DNN pair.

The method may further comprise: checking the second RSN for an associated DNN paired with the first DNN is stored or not.

The method may further comprise: receiving, from the second SMF node, a message further comprises a second DNN and an associated DNN pair which relates to the first DNN.

The method may further comprise: checking whether the first RSN and an identifier of the first PDU session related to a first DNN paired with the second DNN received from the second SMF are stored or not.

The third message may further comprise the second DNN.

The method may further comprise: checking the first RSN allocated by the first SMF node and the identifier of the first PDU session, based on the second DNN and an associated DNN pair which relates to the first DNN.

<A General Example to which Disclosures of the Present Disclosure May be Applied>

A part of disclosures of the present disclosure as described above may be summarized as follows.

In what follows, an apparatus to which disclosures of the present disclosure may be applied will be described.

Figure 15:
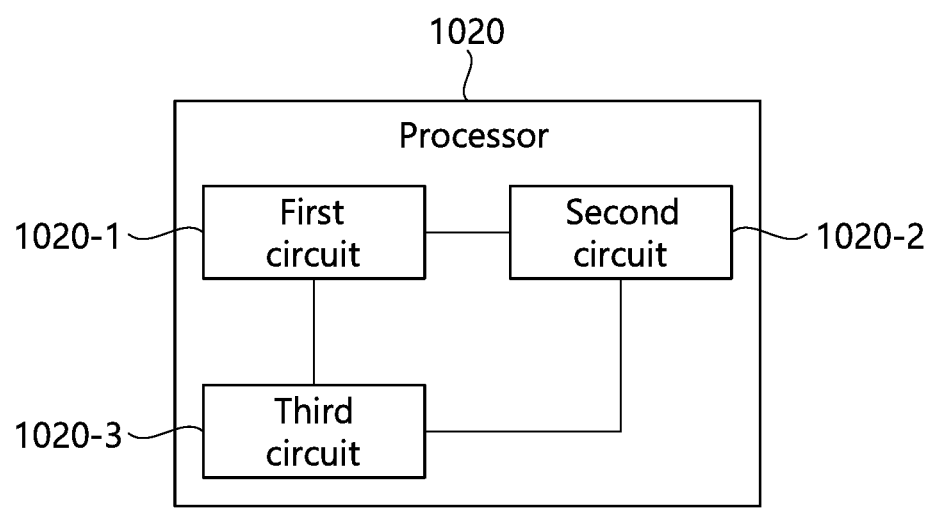
FIG. 15 illustrates a block diagram of a processor in which the present disclosure is implemented.

FIG. 15 illustrates a block diagram of a processor in which the present disclosure is implemented.

As may be seen from FIG. 15, the processor 1020 in which the present disclosure is implemented may include a plurality of circuitry to implement functions, procedures and/or methods described in the present disclosure. For example, the processor 1020 may include a first circuit 1020-1, a second circuit 1020-2, and a third circuit 1020-3. Also, although not shown in the figure, the processor 1020 may include more circuits. Each circuit may include a plurality of transistors.

The processor 1020 may be called Application-Specific Integrated Circuit (ASIC) or Application Processor (AP) and may include at least one of a Digital Signal Processor (DSP), a Central Processing Unit (CPU), and a Graphics Processing Unit (GPU).

Figure 16:
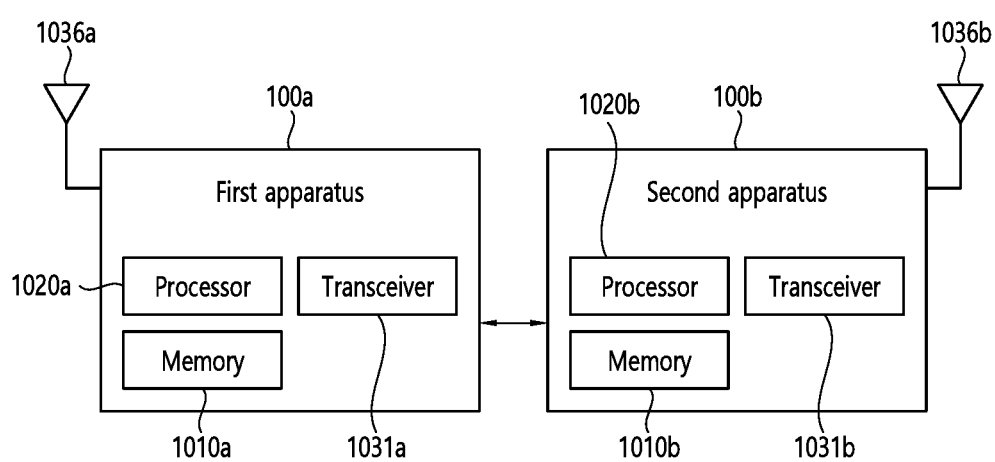
FIG. 16 illustrates a wireless communication system according to one embodiment.

Although not shown in the figure, the processor may further include a fourth circuit, and the fourth circuit FIG. 16 shows a wireless communication system according to an embodiment.

Referring to FIG. 16, a wireless communication system may include a first device 100a and a second device 100b.

The first device 100a may be a terminal as described in the present disclosure. Or, the first device 100a may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the 4th industrial revolution.

The second device 100b may be a network node (e.g., AMF or MME) as described in the present disclosure. The second device 100b may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the 4th industrial revolution.

For example, a terminal may include a mobile phone, a smart phone, a laptop computer, a digital broadcasting terminal, a personal digital assistants (PDA), a portable multimedia player (PMP), a navigation, a slate PC, a table PC, an ultrabook, a wearable device (e.g., a smartwatch, a smart glass, a head mounted display (HMD)), or the like. For example, the HMD may be a display device worn on a head. For example, the HMD may be used to implement VR, AR, or MR.

For example, the drone may be an unmanned aerial vehicle which flies by using a radio control signal. For example, the VR device may include a device for realizing an object, background, or the like of a virtual world. For example, the R device may include a device for realizing an object or background of a virtual world by connecting with an object or background or the like of a real world. For example, the MR device may include a device for realizing an object or background of a virtual world by merging an object, background, or the like of a real world. For example, the hologram device may include a device for recording and reproducing stereoscopic information to realize a 360-degree stereoscopic image, by utilizing light interference which occurs when two laser beams called holography are met. For example, the public safety device may include an image relay device or an image device or the like which can be worn on a user's body. For example, the MTC device and the IoT device may be devices not requiring direct human intervention or manipulation. For example, the MTC device and the IoT device may include a smart meter, a bending machine, a thermometer, a smart bulb, a door lock, or various sensors. For example, the medical device may be a device used for diagnosing, curing, alleviating, treating, or preventing a disease. For example, the medial device may be a device used for diagnosing, curing, alleviating or ameliorating an injury or disorder. For example, the medial device may be a device used for inspecting, replacing, or modifying a structure or function. For example, the medical device may be a device used for controlling pregnancy. For example, the medical device may include a diagnostic device, a surgical device, a (in vitro) diagnostic device, a hearing aid, or a treatment device. For example, the security device may be a device installed to prevent potential hazards and maintain security. For example, the security device may be a camera, a CCTV, a recorder, or a black box. For example, the Fin-Tech device may be a device capable of providing financial services such as mobile payment. For example, the Fin-tech device may include a payment device or a point of sales (POS). For example, the climate/environmental device may include a device for monitoring or predicting climates/environments.

The first device 100a may include at least one processor such as a processor 1020a, at least one memory such as a memory 1010a, and at least one transceiver such as a transceiver 1031a. The processor 1020a may perform the aforementioned functions, procedures, and/or methods. The processor 1020a may perform one or more protocols. For example, the processor 1020a may perform one or more layers of a radio interface protocol. The memory 1010a may be coupled to the processor 1020a, and may store various types of information and/or commands. The transceiver 1031a may be coupled to the processor 1020a, and may be controlled to transmit/receive a radio signal.

The second device 100b may include at least one processor such as a processor 1020b, at least one memory such as a memory 1010b, and at least one transceiver such as a transceiver 1031b. The processor 1020b may perform the aforementioned functions, procedures, and/or methods. The processor 1020b may perform one or more protocols. For example, the processor 1020b may perform one or more layers of a radio interface protocol. The memory 1010b may be coupled to the processor 1020b, and may store various types of information and/or commands. The transceiver 1031b may be coupled to the processor 1020b, and may be controlled to transmit/receive a radio signal.

The memory 1010a and/or the memory 1010b may be connected internally or externally to the processor 1020a and/or the processor 1020b, respectively, or may be connected to other processors through various techniques such as wired or wireless connections.

The first device 100a and/or the second device 100b may have one or more antennas. For example, an antenna 1036a and/or an antenna 1036b may be configured to transmit/receive a radio signal.

Figure 17:
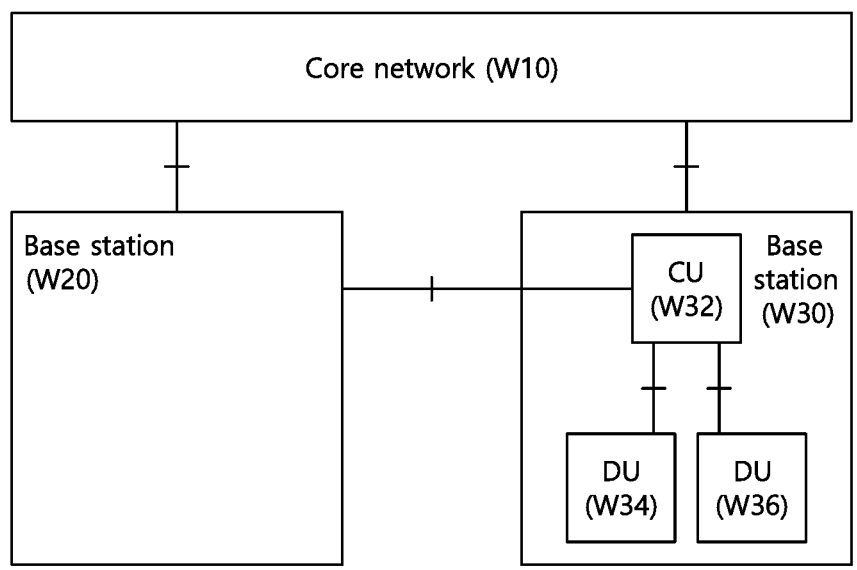
FIG. 17 illustrates a block diagram of a network node according to one embodiment.

FIG. 17 is a block diagram of a network node according to an embodiment.

In particular, FIG. 17 illustrates in detail the case where a base station is divided into a Central Unit (CU) and a Distributed Unit (DU).

Referring to FIG. 17, base stations W20 and W30 may be connected to a core network W10, and the base station W30 may be connected to the neighboring base station W20. For example, an interface between the base stations W20 and W30 and the core network W10 may be referred to as NG, and an interface between the base station W30 and the neighboring base station W20 may be referred to as Xn.

The base station W30 may be divided into a CU W32 and DUs W34 and W36. That is, the base station W30 may be managed by being separated in a layered manner. The CU W32 may be connected to one or more DUs W34 and W36. For example, an interface between the CU W32 and the DUs W34 and W36 may be referred to as F1. The CU W32 may perform a function of higher layers of the base station, and the DUs W34 and W36 may perform a function of lower layers of the base station. For example, the CU W32 may be a logical node for hosting radio resource control (RRC), service data adaptation protocol (SDAP), and packet data convergence protocol (PDCP) layers of the base station (e.g., gNB), and the DUs W34 and W36 may be a logical node for hosting radio link control (RLC), media access control (MAC), and physical (PHY) layers of the base station. Alternatively, the CU W32 may be a logical node for hosting RRC and PDCP layers of the base station (e.g., en-gNB).

Operations of the DUs W34 and W36 may be partially controlled by the CU W32. One DU W34 or W36 may support one or more cells. One cell may be supported only by one DU W34 or W36. One DU W34 or W36 may be connected to one CU W32, and one DU W34 or W36 may be connected to a plurality of CUs by proper implementation.

Figure 18:
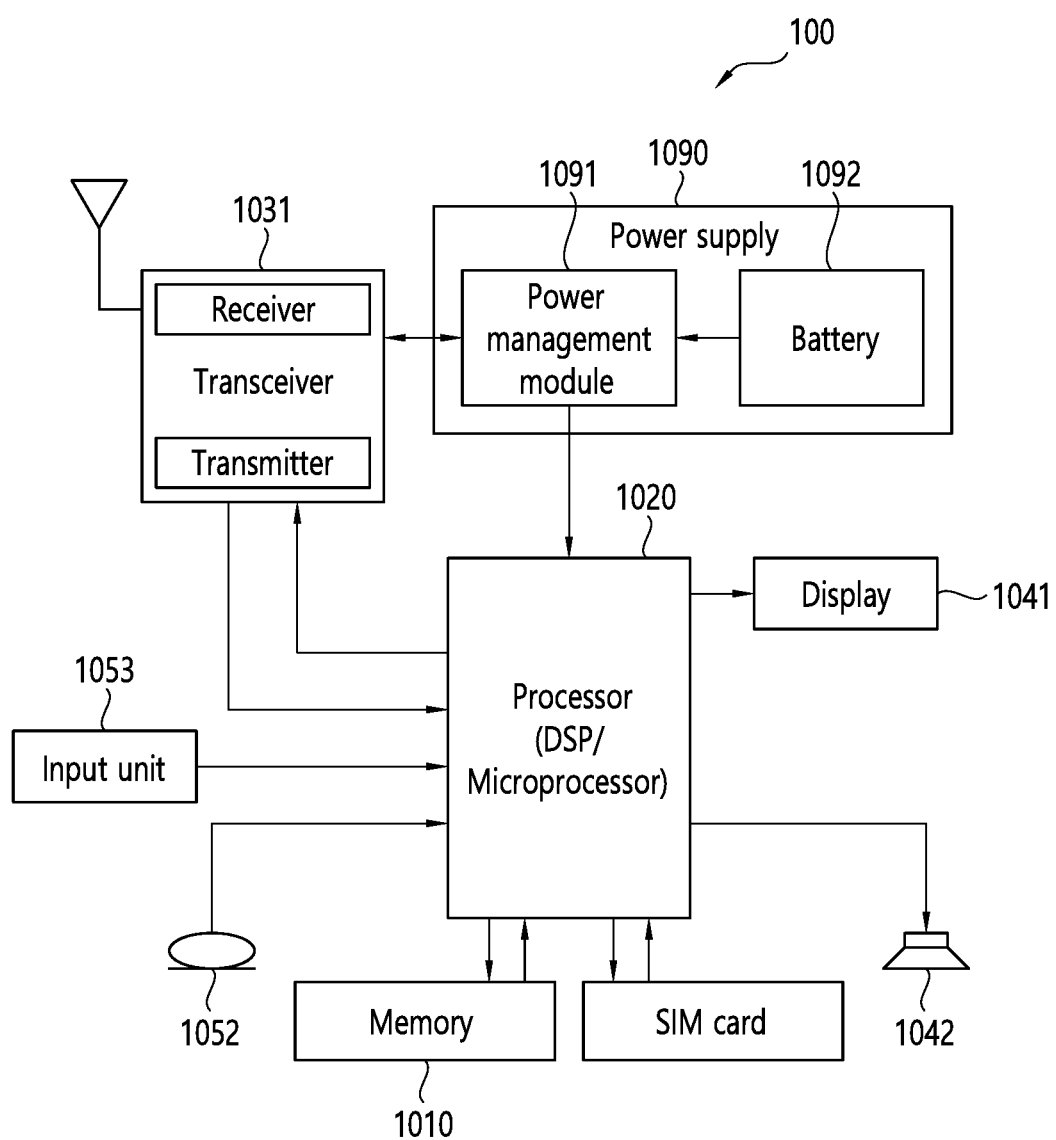
FIG. 18 illustrates a block diagram of a UE according to one embodiment.

FIG. 18 is a block diagram showing a structure of a terminal according to an embodiment.

In particular, FIG. 18 shows an example of the terminal of FIG. 16 in greater detail.

A terminal includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

<Scenario to which the Present Disclosure may be Applied>

In what follows, scenarios to which the disclosures above may be applied will be described.

According to the present disclosure, an always-on PDU session for URLLC exhibiting a feature of low latency may be applied to the following 5G scenarios including artificial intelligence, robot, autonomous driving, and extended reality.

Figure 19:
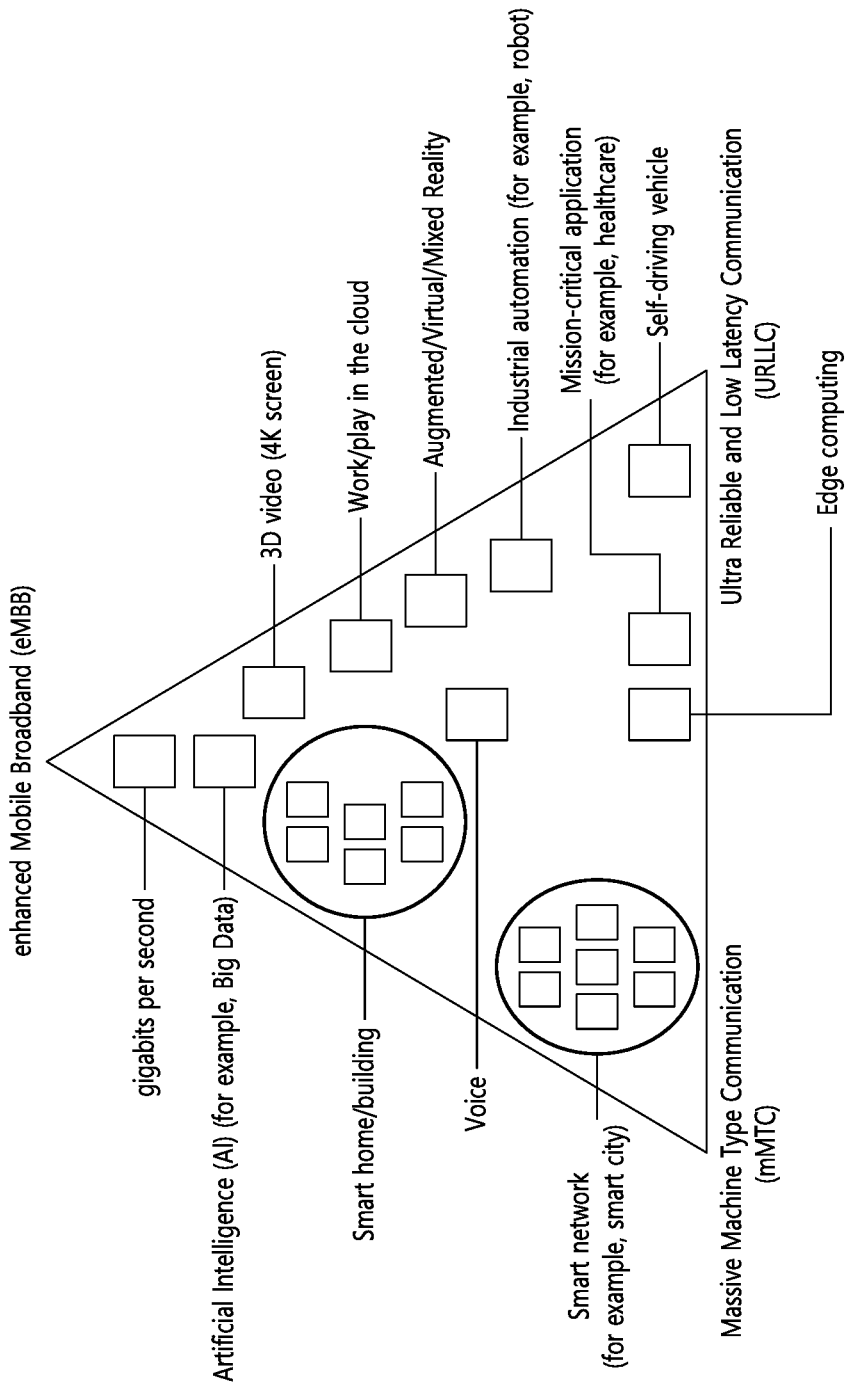
FIG. 19 illustrates one example of a 5G use case scenario.

FIG. 19 illustrates one example of a 5G use case scenario.

The 5G use case scenario shown in FIG. 19 is only an example, and technical characteristics of the present disclosure may also be applied to other 5G use case scenarios.

Referring to FIG. 19, three primary requirement areas of the 5G include (1) the enhanced Mobile Broadband (eMBB) area, (2) the massive Machine Type Communication (MTC) area, and (3) the Ultra-Reliable and Low Latency Communication (URLLC) area. Part of the use cases may require a plurality of areas for the purpose of optimization while other use cases may focus only on a single key performance indicator (KPI). The 5G supports the various use case scenarios in a flexible and reliable manner.

The eMBB focuses on overall improvement of a data rate, latency, user density, mobile broadband access capacity, and coverage. The eMBB aims at a throughput of about 10 Gbps. The eMBB allows to surpass basic mobile Internet access, and covers sufficient interactive tasks, media in a cloud or augmented reality, and entertainment application. Data is one of the core engine for 5G, and it seems that a dedicated voice service can be seen for the first time in the 5G era. In the 5G, it is expected that voice will be simply processed with an application program by using a data connection provided by a communication system. A main reason of an increased traffic amount is an increase in a content size and an increase in the number of applications requiring a high data transfer rate. A streaming service (audio and video), interactive video, and mobile Internet connectivity will be more widely used as more devices are connected to the Internet. These many applications require always-on connectivity to push real-time information and notifications to a user. There is a rapid increase in cloud storage and applications in a mobile communication platform, which is applicable to both work and entertainment. The cloud storage is a special example of driving an increase in an uplink data transfer rate. The 5G is also used for a remote task on the cloud, and requires much lower end-to-end latency to maintain excellent user experience when a tactile interface is used. Taking entertainment for example, cloud games and video streaming are another key element requiring improvement in mobile broadband capability. The entertainment is essential in a smartphone and a tablet anywhere, including a high mobility environment such as a train, a car, and an airplane. Another usage example is augmented reality and information retrieval for entertainment. Herein, the augmented reality requires very low latency and an instantaneous data amount.

The mMTC is designed to enable communication between a plenty of low-cost devices driven by batteries and is intended to support an application such as smart metering, logistics, and field and body sensors. The mMTC aims at about 10-year-lifespan batteries and/or about million devices per square kilometer (1 km2). The mMTC may configure a sensor network by seamlessly connecting an embedded sensor in all sectors, and is one of the most expected 5G usage examples. Potentially, it is predicted that the number of IoT devices will reach 20.4 billion by 2020. A smart network utilizing industrial IoT is one of areas where the 5G plays a key role in enabling smart cities, asset tracking, smart utilities, agriculture, and security infrastructures.

The URLLC allows a device and a machine to communicate with very high reliability, very low latency, and high availability, and thus is identical to communication and control between self-driving vehicles, industrial control, factory automation, mission-critical applications such as remote operations and healthcare, smart grids, and public safety applications. The URLLC aims at a latency of about 1 ms. The URLLC includes a new service which will change the industry through a link with high-reliability/ultra-low latency such as remote control and self-driving vehicles. A level of reliability and latency is essential for smart grid control, industrial automation, robotics, and drone control and adjustment.

Next, a plurality of usage examples included in the triangle of FIG. 13 will be described in greater detail.

In 5G, fiber-to-the-home (FTTH) and cable-based broadband (or DOCSIS) may be compensated as a means of providing a stream rated in the range from hundreds of megabits per second to gigabits per second. This fast speed may be required not only in virtual reality (VR) and augmented reality (AR) but also in transferring TV broadcasting in the resolution of at least 4 K (6K, 8K, or higher). VR and AR applications include almost immersive sports events. A specific application may require a special network configuration. For example, in case of the VR game, a game company may have to integrate a core server with an edge network server of an operator in order to minimize latency.

Automotive is expected to become an important new engine for 5G, together with many usages for mobile communications for vehicles. For example, entertainment for a passenger demands high capacity and high mobile broadband at the same time. This is because future users will continue to expect high-quality connectivity regardless of their locations and speeds. Another usage example of the automotive sector is an augmented reality dashboard. Through the augmented reality dashboard, a driver is able to identify an object, in the dark, shown above that the driver is seeing through a windshield. The augmented reality dashboard displays information to be reported to the driver as to a distance and movement of an object in an overlapping manner. In the future, a radio module will enable communication between vehicles, information exchange between a vehicle and a supported infrastructure, and information exchange between an automotive and another connected device (e.g., a device carried by a pedestrian). The safety system guides an alternative course of action so that the driver can drive more safely, thereby decreasing a risk of accidents. A next step will be a remote control vehicle or a self-driving vehicle. This requires very reliable and very fast communication between different self-driving vehicles and/or between an automotive and an infrastructure. In the future, the self-driving vehicle will perform all driving activities, and the driver will focus only on erroneous traffic which cannot be identified by the vehicle itself. A technical requirement of the self-driving vehicle is ultra-low latency and ultra-high reliability so that traffic safety is increased to a level that cannot be achieved by humans.

A smart city and a smart home, referred to as a smart society, will be embedded in a high-density wireless sensor network as an example of a smart network. A distributed network of an intelligent sensor will identify a condition for cost and energy-efficient maintenance of a city or home. A similar configuration may be performed for each household. A temperature sensor, a window and heating controller, a burglar alarm, and home appliance are all wirelessly connected. Many of these sensors typically require a low data rate, low power, and low cost. For example, however, real-time HD video may be required in a specific-type device for surveillance.

Since consumption and distribution of energy, including heat or gas, are highly dispersed, automated control of a distributed sensor network is required. The smart grid interconnects these sensors by using digital information and communication techniques to collect information and act according to the information. This information may include acts of suppliers and consumers, allowing the smart grid to improve distribution of fuels such as electricity in an efficient, reliable, production sustainable, and automated manner. The smart grid may be regarded as another sensor network with low latency.

The health sector has many applications which can benefit from mobile communication. A communication system may support telemedicine which provides a clinical care in remote locations. This may help to reduce a barrier for a distance, and may improve access to a medical service which cannot be persistently used in a far rural area. This is also used to save lives in a critical care and an emergency situation. A wireless sensor network based on mobile communication may provide remote monitoring and sensors for parameters such as heart rates and blood pressure.

Wireless and mobile communications are becoming gradually important in an industrial application sector. Wiring is expensive in terms of installation and maintenance cost. Therefore, a possibility of replacing a cable with a wireless link that can be reconfigured is an attractive opportunity in many industrial sectors. However, to achieve this, wireless connectivity is required to operate with latency, reliability, and capacity similar to those of a cable, and to be managed in a simplified manner. Low latency and very low error probability are new requirements, which requires 5G connectivity.

Logistics and cargo tracking are an important usage example for mobile communication which enables inventory and package tracking anywhere by using a location-based information system. An example of using logistics and cargo tracking typically requires a low data rate, but requires wide range and reliable location information.

<Artificial Intelligence (AI)>

Artificial intelligence refers to a sector that studies artificial intelligence and a methodology for creating it. Machine learning refers to a sector that defines various problems dealt in an artificial intelligent sector and studies a methodology for solving the problems. The machine learning is also defined as an algorithm that improves performance of a task through a steady experience for a certain task.

The artificial neural network (ANN) is a model used for machine learning, which may mean a collection of models comprising artificial neurons (nodes) forming a network via connection of synapses and having a problem-solving capability. An artificial neural network may be defined by a connection pattern among neurons forming different layers, a learning process for updating model parameters, and an activation function for generating output values.

An artificial neural network may include an input layer, an output layer, and optionally, one or more hidden layers. Each layer have one or more neurons, and the artificial neural network may include synapses for connecting neurons with each other. In the artificial neural network, each neuron may output function values of activation functions from input signals input through synapses, weights, and biases.

Model parameters mean parameters determined through learning and include weights for synapse connections and biases of neurons. And hyper-parameters mean those parameters that have to be set up before the learning process in a machine learning algorithm, which include a learning rate, the number of repetitions, size of mini-batches, and an initialization function.

The purpose of learning in the artificial neural network may be considered to determine model parameters which minimize a loss function. The loss function may be used as an index for determining the optimal model parameters during a learning process of the artificial neural network.

Machine learning may be classified into supervised learning, unsupervised learning, and reinforced learning depending on the learning scheme.

Supervised learning is a method for training an artificial neural network when labels are given for learning data, where a label may mean an expected answer (or a result value) that the artificial neural network is expected to infer when the learning data is input to the artificial neural network. Unsupervised learning may mean a method for training an artificial neural network while labels for learning data are not given. Reinforcement learning may mean a learning method that trains an artificial neural network in such a way that an agent defined in a particular environment is forced to take an action or a sequence of actions that maximizes cumulative reward in each state.

Among artificial neural networks, machine learning implemented by a Deep Neural Network (DNN) including a plurality of hidden layers is called deep learning. Deep learning is considered to be a part of machine learning. In what follows, machine learning is used as a notion that includes deep learning.

<Robot>

A robot may mean a machine which automatically operates or processes a given task according to its own capability. In particular, a robot having a function of performing an operation by recognizing an environment and by autonomously making a decision may be referred to as an intelligent robot.

The robot may be classified for industrial, medical, household, and military purposes depending on the purpose or field of use.

The robot may include a driving unit having an actuator or a motor to perform various physical operations such as moving a robot joint. In addition, a movable robot may include a wheel, a brake, a propeller, and the like in the driving unit, thereby being able to driving on the ground or flying in their through the driving unit.

<Self-Driving (Autonomous-Driving)>

Self-driving means an autonomous-driving technique, and a self-driving vehicle means a vehicle that travels without user's manipulation or with minimum user' manipulation.

For example, the self-driving may include all of a technique for maintaining a lane while driving, a technique for automatically controlling speed such as adaptive cruise control, a technique for automatically traveling along a predetermined route, and a technique for traveling by automatically setting a route when a destination is determined.

The vehicle may include all of a vehicle having only an internal combustion engine, a hybrid vehicle having an internal combustion engine and an electric motor together, and an electric vehicle having only an electric motor, and may include not only an automotive vehicle but also a train, a motorcycle, etc.

In this case, the self-driving vehicle may be regarded as a robot having an autonomous-driving function.

<eXtended Reality (XR)>

Extended reality collectively refers to virtual reality (VR), augmented reality (AR), and mixed reality (MR). A VR technique is a computer graphic technique providing real-world objects and backgrounds only as CG images. An AR technique a computer graphic technique providing virtual CG images together on real object images. An MR technique is a computer graphic technique providing virtual objects in the real world in a mixed and combined manner.

The MR technique is similar to the AR technology in a sense that a real object and a virtual object are shown together. However, the AR technology in which the virtual object is used as a complement to the real object differs from the MR technology in which the virtual object and the real object are used in an equal manner.

The XR technique may be applied to a head-mount display (HMD), a head-up display (HUD), a mobile phone, a tablet PC, a laptop, a desktop, TV, a digital signage, etc., and a device to which the XR technique is applied may be referred to as an XR device.

Figure 20:
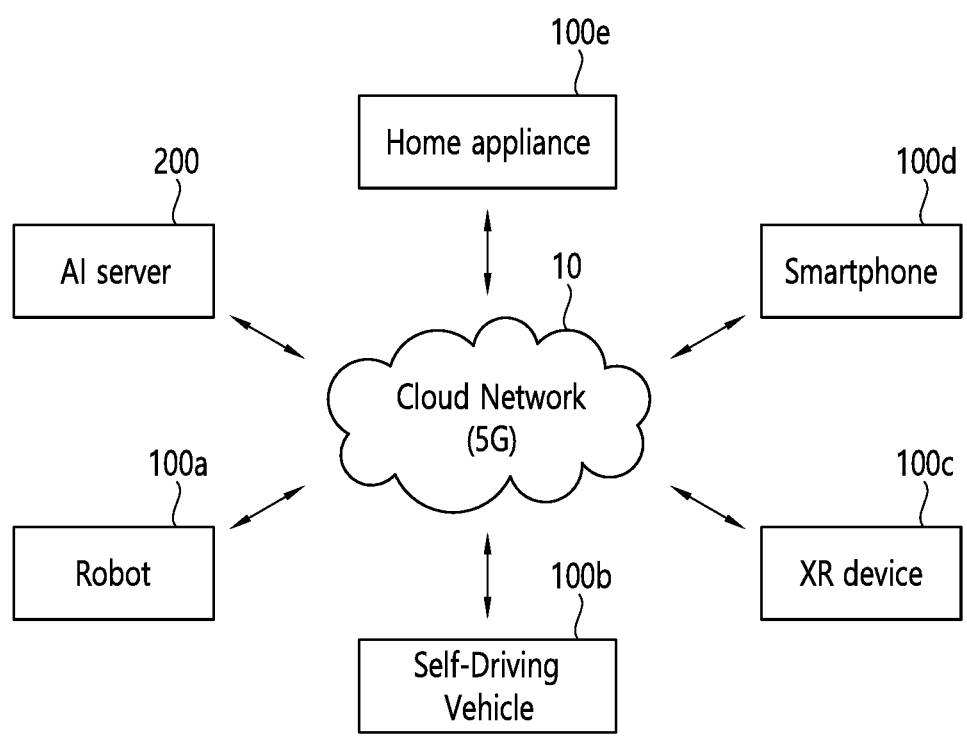
FIG. 20 illustrates an AI system according to one embodiment.

FIG. 20 shows an AI system 1 according to an embodiment.

Referring to FIG. 20, in the AI system 1, at least one of an AI server 200, a robot 100a, a self-driving vehicle 100b, an XR device 100c, a smart phone 100d, and a home appliance 100e is connected to a cloud network 10. Herein, the robot 100a, self-driving vehicle 100b, XR device 100c, smart phone 100d, or home appliance 100e to which the AI technique is applied may be referred to as AI devices 100a to 100e.

The cloud network 10 may mean a network which constructs part of a cloud computing infrastructure or which exists in the cloud computing infrastructure. Herein, the cloud network 10 may be configured by using a 3G network, a 4G or long term evolution (LTE) network, or a 5G network.

That is, each of the devices 100a to 100e and 200 constituting the AI system 1 may be connected to each other through the cloud network 10. In particular, the devices 100a to 100e and 200 may communicate with each other via a base station, but may communicate with each other directly without having to use the base station.

The AI server 200 may include a server which performs AI processing and a server which performs an operation for big data.

The AI server 200 may be connected to at least one of the AI devices constituting the AI system 1, that is, the robot 100a, the self-driving vehicle 100b, the XR device 100c, the smart phone 100d, and the home appliance 100e through the cloud network 10, and may assist at least part of AI processing of the connected AI devices 100a to 100e.

In this case, the AI server 200 may serve to learn an artificial neural network according to a machine learning algorithm on behalf of the AI devices 100a to 100e, and may directly store a learning model or transmit it to the AI devices 100a to 100e.

In this case, the AI server 200 may receive input data from the AI devices 100a to 100e, infer a result value for the input data received using the learning module, and generate a control command or a response based on the inferred result value to transmit it to the AI devices 100a to 100e.

Alternatively, the AI devices 100a to 100e may infer the result value for the input data by using a direct learning model and generate a control command and a response based on the inferred result value.

Hereinafter, various embodiments of the AI devices 100a to 100e to which the aforementioned techniques are applied will be described.

<AI+Robot>

The robot 100a may be implemented as a guide robot, a carrying robot, a cleaning robot, a wearable robot, an entertainment robot, a pet robot, an unmanned flying robot, etc., by applying the AI technique.

The robot 100a may include a robot control module for controlling an operation, and the robot control module may mean a software module or a chip implementing the software module as hardware.

The robot 100a may use sensor information acquired from various types of sensors to obtain status information of the robot 100a, to detect (recognize) a surrounding environment and an object, to generate map data, to determine a travel route and a driving plan, to determine a response for user interaction, or to determine an operation.

Herein, the robot 100a may use the sensor information acquired from at least one sensor among a lidar, a radar, and camera to determine a travel path and a driving plan.

The robot 100a may use a leaning model consisting of at least one artificial neural network to perform the aforementioned operations. For example, the robot 100a may use the leaning model to recognize a surrounding environment and an object, and may use the recognized surrounding environment information or object information to determine an operation. Herein, the leaning model may be learned directly from the robot 100a or learned from an external device such as the AI server 200 or the like.

In this case, the robot 100a may generate a result and perform an operation by directly using the learning model. However, it is also possible to perform an operation by transmitting sensor information to the external device such as the AI server 200 or the like and by receiving a result generated based thereon.

The robot 100a may determine the travel path and the driving plan by using at least one of map date, object information detected from sensor information, and object information acquired from an external device, and may control a driving unit so that the robot 100a travels according to the determined travel path and driving plan.

The map data may include object identification information on various objects arranged in a space in which the robot 100a moves. For example, the map data may include object identification information on stationary objects such as walls, doors, or the like and movable objects such as flowerpots, desks, or the like. In addition, the object identification information may include a name, a type, a distance, a location, or the like.

In addition, the robot 100a may control the driving unit on the basis of a user's control/interaction to travel or perform an operation. In this case, the robot 100a may acquire the intention information of an interaction based on a user's action or voice utterance, and may determine a response based on the acquired intention information to perform an operation.

<AI+Self-Driving>

By employing the AI technology, the self-driving vehicle 100b may be implemented as a mobile robot, unmanned ground vehicle, or unmanned aerial vehicle.

The self-driving vehicle 100b may include a self-driving module for controlling its self-driving function, where the self-driving control module may correspond to a software module or a chip which implements the software module in the form of a hardware device. The self-driving control module may be installed inside the self-driving vehicle 100b as a constituting element thereof or may be installed outside the self-driving vehicle 100b as a separate hardware component.

The self-driving vehicle 100b may obtain status information of the self-driving vehicle 100b, detect (recognize) the surroundings and objects, generate map data, determine a travel path and navigation plan, or determine motion by using sensor information obtained from various types of sensors.

Like the robot 100a, the self-driving vehicle 100b may use sensor information obtained from at least one or more sensors among lidar, radar, and camera to determine a travel path and navigation plan.

In particular, the self-driving vehicle 100b may recognize an occluded area or an area extending over a predetermined distance or objects located across the area by collecting sensor information from external devices or receive recognized information directly from the external devices.

The self-driving vehicle 100b may perform the operations above by using a learning model built on at least one or more artificial neural networks. For example, the self-driving vehicle 100b may recognize the surroundings and objects by using the learning model and determine its navigation route by using the recognized surroundings or object information. Here, the learning model may be the one trained by the self-driving vehicle 100b itself or trained by an external device such as the AI server 200.

At this time, the self-driving vehicle 100b may perform the operation by generating a result by employing the learning model directly but also perform the operation by transmitting sensor information to an external device such as the AI server 200 and receiving a result generated accordingly.

The self-driving vehicle 100b may determine a travel path and a navigation plan by using at least one or more of object information detected from the map data and sensor information or object information obtained from an external device and navigate according to the determined travel path and the navigation plan by controlling its driving platform.

Map data may include object identification information about various objects disposed in the space (for example, road) in which the self-driving vehicle 100b navigates. For example, the map data may include object identification information about static objects such as streetlights, rocks and buildings and movable objects such as vehicles and pedestrians. And the object identification information may include the name, type, distance, location, and so on.

Also, the self-driving vehicle 100b may perform the operation or navigate the space by controlling its driving platform based on the control/interaction of the user. At this time, the self-driving vehicle 100b may obtain intention information of the interaction due to the user's motion or voice command and perform an operation by determining a response based on the obtained intention information.

<AI+XR>

By employing the AI technology, the XR device 100c may be implemented as a Head-Mounted Display (HMD), a Head-Up Display (HUD) installed at the vehicle, TV, a mobile phone, a smartphone, a computer, a wearable device, a home appliance, a digital signage, a vehicle, a robot with a fixed platform, or a mobile robot.

The XR device 100c may obtain information about the surroundings or physical objects by generating position and attribute data about 3D points by analyzing 3D point cloud or image data acquired from various sensors or external devices and output objects in the form of XR objects by rendering the objects for display.

The XR device 100c may perform the operations above by using a learning model built on at least one or more artificial neural networks. For example, the XR device 100c may recognize physical objects from 3D point cloud or image data by using the learning model and provide information corresponding to the recognized physical objects. Here, the learning model may be the one trained by the XR device 100c itself or trained by an external device such as the AI server 200.

At this time, the XR device 100c may perform the operation by generating a result by employing the learning model directly but also perform the operation by transmitting sensor information to an external device such as the AI server 200 and receiving a result generated accordingly.

<AI+Robot+Self-Driving>

By employing the AI and self-driving technologies, the robot 100a may be implemented as a guide robot, a transport robot, a cleaning robot, a wearable robot, an entertainment robot, a pet robot, or an unmanned flying robot.

The robot 100a employing the AI and self-driving technologies may correspond to a robot itself having a self-driving function or a robot 100a interacting with the self-driving vehicle 100b.

The robot 100a having the self-driving function may correspond collectively to the devices which may move autonomously along a given path without control of the user or which may move by determining its path autonomously.

The robot 100a and the self-driving vehicle 100b having the self-driving function may use a common sensing method to determine one or more of the travel path or navigation plan. For example, the robot 100a and the self-driving vehicle 100b having the self-driving function may determine one or more of the travel path or navigation plan by using the information sensed through lidar, radar, and camera.

The robot 100a interacting with the self-driving vehicle 100b, which exists separately from the self-driving vehicle 100b, may be associated with the self-driving function inside or outside the self-driving vehicle 100b or perform an operation associated with the user riding the self-driving vehicle 100b.

At this time, the robot 100a interacting with the self-driving vehicle 100b may obtain sensor information in place of the self-driving vehicle 100b and provide the sensed information to the self-driving vehicle 100b; or may control or assist the self-driving function of the self-driving vehicle 100b by obtaining sensor information, generating information of the surroundings or object information, and providing the generated information to the self-driving vehicle 100b.

Also, the robot 100a interacting with the self-driving vehicle 100b may control the function of the self-driving vehicle 100b by monitoring the user riding the self-driving vehicle 100b or through interaction with the user. For example, if it is determined that the driver is drowsy, the robot 100a may activate the self-driving function of the self-driving vehicle 100b or assist the control of the driving platform of the self-driving vehicle 100b. Here, the function of the self-driving vehicle 100b controlled by the robot 100b may include not only the self-driving function but also the navigation system installed inside the self-driving vehicle 100b or the function provided by the audio system of the self-driving vehicle 100b.

Also, the robot 100a interacting with the self-driving vehicle 100b may provide information to the self-driving vehicle 100b or assist functions of the self-driving vehicle 100b from the outside of the self-driving vehicle 100b. For example, the robot 100a may provide traffic information including traffic sign information to the self-driving vehicle 100b like a smart traffic light or may automatically connect an electric charger to the charging port by interacting with the self-driving vehicle 100b like an automatic electric charger of the electric vehicle.

<AI+Robot+XR>

By employing the AI technology, the robot 100a may be implemented as a guide robot, a transport robot, a cleaning robot, a wearable robot, an entertainment robot, a pet robot, or an unmanned flying robot.

The robot 100a employing the XR technology may correspond to a robot which acts as a control/interaction target in the XR image. In this case, the robot 100a may be distinguished from the XR device 100c, both of which may operate in conjunction with each other.

If the robot 100a, which acts as a control/interaction target in the XR image, obtains sensor information from the sensors including a camera, the robot 100a or XR device 100c may generate an XR image based on the sensor information, and the XR device 100c may output the generated XR image. And the robot 100a may operate based on the control signal received through the XR device 100c or based on the interaction with the user.

For example, the user may check the XR image corresponding to the viewpoint of the robot 100a associated remotely through an external device such as the XR device 100c, modify the navigation path of the robot 100a through interaction, control the operation or navigation, or check the information of nearby objects.

<AI+Self-Driving+XR>

By employing the AI and XR technologies, the self-driving vehicle 100b may be implemented as a mobile robot, an unmanned ground vehicle, or an unmanned aerial vehicle.

The self-driving vehicle 100b employing the XR technology may correspond to a self-driving vehicle having a means for providing XR images or a self-driving vehicle which acts as a control/interaction target in the XR image. In particular, the self-driving vehicle 100b which acts as a control/interaction target in the XR image may be distinguished from the XR device 100c, both of which may operate in conjunction with each other.

The self-driving vehicle 100b having a means for providing XR images may obtain sensor information from sensors including a camera and output XR images generated based on the sensor information obtained. For example, by displaying an XR image through HUD, the self-driving vehicle 100b may provide XR images corresponding to physical objects or image objects to the passenger.

At this time, if an XR object is output on the HUD, at least part of the XR object may be output so as to be overlapped with a physical object at which the passenger gazes. On the other hand, if an XR object is output on a display installed inside the self-driving vehicle 100b, at least part of the XR object may be output so as to be overlapped with an image object. For example, the self-driving vehicle 100b may output XR objects corresponding to the objects such as roads, other vehicles, traffic lights, traffic signs, bicycles, pedestrians, and buildings.

If the self-driving vehicle 100b, which acts as a control/interaction target in the XR image, obtains sensor information from the sensors including a camera, the self-driving vehicle 100b or the XR device 100c may generate an XR image based on the sensor information, and the XR device 100c may output the generated XR image. And the self-driving vehicle 100b may operate based on the control signal received through an external device such as the XR device 100c or based on the interaction with the user.

In this document, preferred embodiments of the present disclosure have been described, but the technical scope of the present disclosure is not limited only to the specific embodiments. Therefore, the present disclosure may be modified, changed, or updated in various ways within the technical principles and scope defined by the appended claims.

In the exemplary system described above, methods are described according to a flow diagram by using a series of steps and blocks. However, the present disclosure is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present disclosure.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. A method for supporting redundant protocol data unit (PDU) sessions, the method performed by a unified data management (UDM) node and comprising:
    1) In a procedure for establishing a first PDU session requested by a user equipment (UE):
    receiving, from a first session management function (SMF) node, a first session management subscription data retrieve message based on a Nudm_SDM_Get service operation;
    transmitting, to the first SMF node, a first session management subscription data message in response to the first session management subscription data retrieve message; and
    receiving, from the SMF node, a first registration message including an identifier of the first PDU session, wherein the first registration message further includes a first redundancy sequence number (RSN) which is allocated by the first SMF node for the first PDU session
    2) In a procedure for establishing a second PDU session requested by the UE:
    receiving, from a second SMF node, a second session management subscription data retrieve message based on the Nudm_SDM_Get service operation;
    transmitting, to the second SMF node, a second session management subscription data message in response to the second session management subscription data retrieve message, wherein the second session management subscription data message includes the first RSN and a PDU session pair ID, which is identical to the identifier of the first PDU session; and
    receiving, from the second SMF node, a second registration message including an identifier of the second PDU session, wherein the second registration message further includes a second RSN which is allocated by the second SMF node for the second PDU session,
    wherein the second PDU session is duplication of the first PDU session.

2. The method of claim 1, wherein the first registration message further comprises a first data network name (DNN) and an associated DNN pair.

3. The method of claim 2, further comprising:
    checking whether the second RSN for an associated DNN paired with the first DNN is stored or not.

4. The method of claim 1,
    wherein the second session management subscription data retrieve message further comprises a second DNN and an associated DNN pair which relates to the first DNN.

5. The method of claim 4, further comprising:
    checking whether the first RSN and the identifier of the first PDU session related to a first DNN paired with the second DNN received from the second SMF are stored or not.

6. The method of claim 4, wherein the second registration message further comprises the second DNN.

7. The method of claim 1, further comprising:
    checking the first RSN allocated by the first SMF node and the identifier of the first PDU session, based on the second DNN and an associated DNN pair which relates to the first DNN.

8. A unified data management (UDM) node, the UDM node comprising:
    at least one processor; and
    at least one memory capable of storing instructions and being connected electrically to the at least one processor operably,
    wherein an operation, performed based on the instructions being executed by the at least one processor, includes:
    1) In a procedure for establishing a first protocol data unit (PDU) session requested by a user equipment (UE):
    receiving, from a first session management function (SMF) node, a first session management subscription data retrieve message based on a Nudm_SDM_Get service operation;
    transmitting, to the first SMF node, a first session management subscription data message in response to the first session management subscription data retrieve message; and
    receiving, from the first SMF node, a first registration message including an identifier of the first PDU session, wherein the first registration message further includes a first redundancy sequence number (RSN) which is allocated by the first SMF node for the first PDU session;

2) In a procedure for establishing a second PDU session requested by the UE:
receiving, from a second SMF node, a second session management subscription data retrieve message based on the Nudm_SDM_Get service operation;
transmitting, to the second SMF node, a second session management subscription data message in response to the second session management subscription data retrieve message, wherein the second session management subscription data message includes the first RSN and a PDU session pair ID, which is identical to the identifier of the first PDU session; and
receiving, from the second SMF node, a second registration message including an identifier of the second PDU session, wherein the second registration message further includes a second RSN which is allocated by the second SMF node for the second PDU session,
wherein the second PDU session is duplication of the first PDU session.

9. The UDM node of claim 8, wherein the first registration message further comprises a first data network name (DNN) and an associated DNN pair.

10. The UDM node of claim 8, wherein the operation further comprises:
checking whether the second RSN for an associated DNN paired with the first DNN is stored or not.

11. The UDM node of claim 8, wherein
the second session management subscription data retrieve message further comprises a second DNN and an associated DNN pair which relates to the first DNN.

12. The UDM node of claim 11, wherein the operation further comprises:
checking whether the first RSN and the identifier of the first PDU session related to a first DNN paired with the second DNN received from the second SMF are stored or not.

13. The UDM node of claim 11, wherein the second registration message further comprises the second DNN.

14. The UDM node of claim 8, wherein the operation further comprises:
checking the first RSN allocated by the first SMF node and the identifier of the first PDU session, based on the second DNN and an associated DNN pair which relates to the first DNN.

* * * * *